(12) United States Patent
Kagimoto et al.

(10) Patent No.: US 11,977,146 B2
(45) Date of Patent: May 7, 2024

(54) RADAR DEVICE AND DETECTION METHOD OF TARGET POSITION OF RADAR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Taishi Kagimoto, Tokyo (JP); Hiroyuki Kobayashi, Tokyo (JP); Takeo Okaniwa, Tokyo (JP); Tadataka Wakabishi, Tokyo (JP); Sadao Matsushima, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 769 days.

(21) Appl. No.: 16/491,915

(22) PCT Filed: Feb. 22, 2018

(86) PCT No.: PCT/JP2018/006597
§ 371 (c)(1),
(2) Date: Sep. 6, 2019

(87) PCT Pub. No.: WO2018/163853
PCT Pub. Date: Sep. 13, 2018

(65) Prior Publication Data
US 2020/0072960 A1 Mar. 5, 2020

(30) Foreign Application Priority Data
Mar. 9, 2017 (JP) ................ 2017-045499

(51) Int. Cl.
*G01S 13/72* (2006.01)
*G01S 3/46* (2006.01)
*H01Q 21/06* (2006.01)

(52) U.S. Cl.
CPC ............... *G01S 13/72* (2013.01); *G01S 3/46* (2013.01); *H01Q 21/068* (2013.01)

(58) Field of Classification Search
CPC . G01S 13/72; G01S 3/46; G01S 7/032; G01S 13/10; G01S 13/426; G01S 13/931;
(Continued)

(56) References Cited

U.S. PATENT DOCUMENTS 7,450,071 B1 * 11/2008 Volman ................ H01Q 9/0457
343/846
8,665,137 B2 * 3/2014 Wintermantel ....... G01S 13/343
342/188

(Continued)

FOREIGN PATENT DOCUMENTS

CN 101383479 A 3/2009
CN 103415939 A 11/2013
(Continued)

OTHER PUBLICATIONS

H. Shinoda and H. Kondoh, "Composite Patch Array Antenna with built-in Polarizer for Reducing Road Clutter Noises of 76 GHz Automotive Radars," 2007 IEEE/MTT-S International Microwave Symposium, 2007, pp. 405-408, doi: 10.1109/MWSYM.2007.380473. (Year: 2007).*

(Continued)

*Primary Examiner* — Olumide Ajibade Akonai
*Assistant Examiner* — Yonghong Li
(74) *Attorney, Agent, or Firm* — Oblon, McClelland, Maier & Neustadt, L.L.P.

(57) ABSTRACT

To provide a radar device capable of detecting a position of a target in a direction orthogonal to a viewing angle.

(Continued)

In a radar device which detects a target by using a radio wave, the radar device includes: a receiving array antenna (receiving array antenna 17) where a plurality of receiving antenna elements (first receiving antenna 17-1 to eighth receiving antenna 17-8) each having a predetermined length in a first direction are arranged to be disposed in a second direction almost orthogonal to the first direction; a dispersion part (dispersion part 31) which is disposed in a vicinity of the receiving array antenna, and dispersion properties of the radio wave change with respect to the first direction; and a detection part (control and process part 15) which detects the position of the target in the first direction based on the radio wave reflected by the dispersion part.

3 Claims, 22 Drawing Sheets

(58) Field of Classification Search
CPC . G01S 2013/0263; G01S 7/02; H01Q 21/068; H01Q 21/12; H01Q 21/065; H01Q 5/378; H01Q 5/385; H01Q 5/392; H01Q 19/005; H01Q 1/38; H01Q 1/42; H01Q 21/06; H01Q 21/24
See application file for complete search history.

(56) References Cited

U.S. PATENT DOCUMENTS

| | | | |
|---|---|---|---|
| 9,035,840 B1* | 5/2015 | Lee | H01Q 13/10 343/702 |
| 2001/0052874 A1 | 12/2001 | Ito | |
| 2007/0057858 A1 | 3/2007 | Lockie et al. | |
| 2007/0279303 A1* | 12/2007 | Schoebel | H01Q 21/0075 343/700 MS |
| 2008/0303711 A1* | 12/2008 | Matsuoka | G01S 13/345 342/196 |
| 2017/0346192 A1 | 11/2017 | Schulte et al. | |

FOREIGN PATENT DOCUMENTS

| | | |
|---|---|---|
| CN | 104656092 A | 5/2015 |
| DE | 10 2014 118 036 A1 | 6/2016 |
| JP | 6-252635 A | 9/1994 |
| JP | 2001-358518 A | 12/2001 |
| JP | 2005-181203 A | 7/2005 |
| JP | 2010-8319 A | 1/2010 |
| JP | 2010-164327 A | 7/2010 |
| JP | 2010-237087 A | 10/2010 |
| JP | 2014-42197 A | 3/2014 |

OTHER PUBLICATIONS

DXengineering.com, "Active Receive Antenna—vertical configuration", 2013, https://static.dxengineering.com/global/images/instructions/dxe-arav3-1-2-4-8p-rev4d.pdf (Year: 2013).*
D. M. Grimes and T. O. Jones, "Automotive radar: A brief review," in Proceedings of the IEEE, vol. 62, No. 6, pp. 804-822, Jun. 1974, doi: 10.1109/PROC.1974.9520. (Year: 1974).*
International Search Report dated Mar. 27, 2018 in PCT/JP2018/006597 filed on Feb. 22, 2018.
Extended European Search Report dated Jul. 1, 2020 in European Patent Application No. 18764751.6, 7 pages.
Combined Chinese Office Action and Search Report dated Aug. 25, 2022 in Patent Application No. 201880016471.8 (with English machine translation), 12 pages.
Office Action issued in Chinese Patent Application No. CN201880016471.8, dated Apr. 14, 2023 with a machine translation, 18 pages.

* cited by examiner

RADAR DEVICE AND DETECTION METHOD OF TARGET POSITION OF RADAR DEVICE

TECHNICAL FIELD

The present invention relates to a radar device and a detection method of a target position of the radar device.

BACKGROUND ART

A radar device generally takes a method analyzing a position where a target exists in a viewing angle. In recent years, a radar device capable of detecting a position of a target in a direction orthogonal to the viewing angle has been proposed.

According to a technology disclosed in Patent Document 1, a real image vertical azimuth which is an azimuth of a real image existing on the ground is calculated from a reflected wave where a transmission wave transmitted from a transmitting antenna is reflected by a target, further a virtual image vertical azimuth which is an azimuth of a virtual image existing under the ground is calculated from a reflected wave where the transmission wave transmitted from the transmitting antenna is reflected by the target and further reflected by the ground, as a vertical azimuth being an azimuth of the target in a direction vertical to the ground. An angular difference between the calculated real image vertical azimuth and virtual image vertical azimuth is calculated, and a height of the target from the ground is calculated by using the calculated angular difference.

PRIOR ART DOCUMENT

Patent Document

Patent Document 1: Japanese Patent Application Laid-open No. 2014-52187

DISCLOSURE OF THE INVENTION

Problems to be Solved by the Invention

However, there is a problem in the technology disclosed in Patent Document 1 that a configuration of the device becomes complicated because it is necessary to use a plurality of transmitting antennas.

An object of the present invention is to provide a radar device and a detection method of a target position of the radar device capable of detecting a position of a target in a direction orthogonal to a viewing angle without complicating the device.

Means for Solving the Problems

To solve the aforementioned problem, the present invention is characterized in that a radar device which detects a target by using a radio wave includes: a receiving array antenna where a plurality of receiving antenna elements each having a predetermined length in a first direction are arranged to be disposed in a second direction almost orthogonal to the first direction; a dispersion part which is disposed in a vicinity of the receiving array antenna, and dispersion properties of the radio wave change with respect to the first direction; and a detection part which detects a position of the target in the first direction based on the radio wave reflected by the dispersion part.

Such a structure makes it possible to detect the position of the target in a direction orthogonal to a viewing angle without complicating the device.

The present invention is characterized in that the receiving array antenna is disposed on a circuit board, and the dispersion part is disposed in the vicinity of the receiving array antenna on the circuit board.

Such a structure makes it possible to simplify the configuration by providing the dispersion part on the same circuit board as the receiving array antenna to suppress an increase in manufacturing cost of the device.

The present invention is characterized in that the receiving array antenna is disposed on a circuit board and the dispersion part is disposed on a radome which is provided to cover the circuit board where the receiving array antenna is disposed.

Such a structure makes it possible to prevent that a size of the circuit board increases by providing the dispersion part on the radome.

The present invention is characterized in that two dispersion parts are disposed so as to sandwich the receiving array antenna, and the two dispersion parts have the same dispersion properties in the first direction.

Such a structure makes it possible to improve detection sensitivity in the first direction by increasing the number of dispersion parts.

The present invention is characterized in that two dispersion parts are disposed so as to sandwich the receiving array antenna, and the two dispersion parts have the dispersion properties inverted from one another in the first direction.

Such a structure makes it possible to improve detection sensitivity in the first direction because inverted outputs can be obtained in accordance with a position in the first direction.

The present invention is characterized in that the receiving antenna elements are disposed with a distance of $\lambda/2$ in the second direction when a wavelength of the radio wave is set as $\lambda$.

Such a structure makes it possible to certainly detect an angle in a viewing angle direction.

The present invention is characterized in that the receiving antenna elements are disposed with a distance of less than $\lambda/2$ in the second direction when a wavelength of the radio wave is set as $\lambda$.

Such a structure makes it possible to obtain information regarding a position where the dispersion part is provided in the second direction.

The present invention is characterized in that the dispersion part is formed by a plurality of resonant elements, the resonant element which resonates at a frequency almost the same as the radio wave is disposed at a center in the first direction, the resonant element which resonates at a low frequency is disposed on a lower side, and the resonant element which resonates at a high frequency is disposed on an upper side.

Such a structure makes it possible to obtain desired dispersion properties by setting the frequencies of the resonant elements.

The present invention is characterized in that a power feeding part which feeds electric power to the dispersion part is included, the power feeding part stops the feeding of the electric power to the dispersion part when the detection part detects the position of the target in the first direction, and the power feeding part feeds the electric power to the dispersion part when the position is not detected.

Such a structure makes it possible to turn on/off a detection function of the position of the target in the first direction according to need.

The present invention is characterized in that the detection part detects the position of the target in the first direction by comparing a signal level of the radio wave reflected by the dispersion part and a predetermined threshold value.

Such a structure makes it possible to detect the position of the target in an elevation angle direction through a simple process.

The present invention is characterized in that the detection part detects the position of the target in the first direction by comparing a signal level of the radio wave reflected by one of the two dispersion parts and a signal level of the radio wave reflected by the other of the two dispersion parts.

Such a structure makes it possible to certainly detect the position of the target in an elevation angle direction through a simple process.

The present invention is characterized in that the detection part is formed by a signal processor.

Such a structure makes it possible to certainly detect the position of the target in an elevation angle direction through a simple configuration.

The present invention is characterized in that in a detection method of a target position of a radar device which detects the target by using a radio wave and includes: a receiving array antenna where a plurality of receiving antenna elements each having a predetermined length in a first direction are arranged to be disposed in a second direction almost orthogonal to the first direction; and a dispersion part which is disposed in a vicinity of the receiving array antenna, and dispersion properties of the radio wave change with respect to the first direction, the detection method comprising: detecting a position of the target in the first direction based on the radio wave reflected by the dispersion part.

Such a structure makes it possible to detect the position of the target in the direction orthogonal to the viewing angle without complicating the device.

Effect of the Invention

According to the present invention, it is possible to provide a radar device and a detection method of a target position of the radar device capable of detecting the position of the target in a direction orthogonal to a viewing angle without complicating a device.

MODES FOR CARRYING OUT THE INVENTION

Next, embodiments of the present invention will be explained.

(A) Explanation of Configuration of First Embodiment

Figure 1:
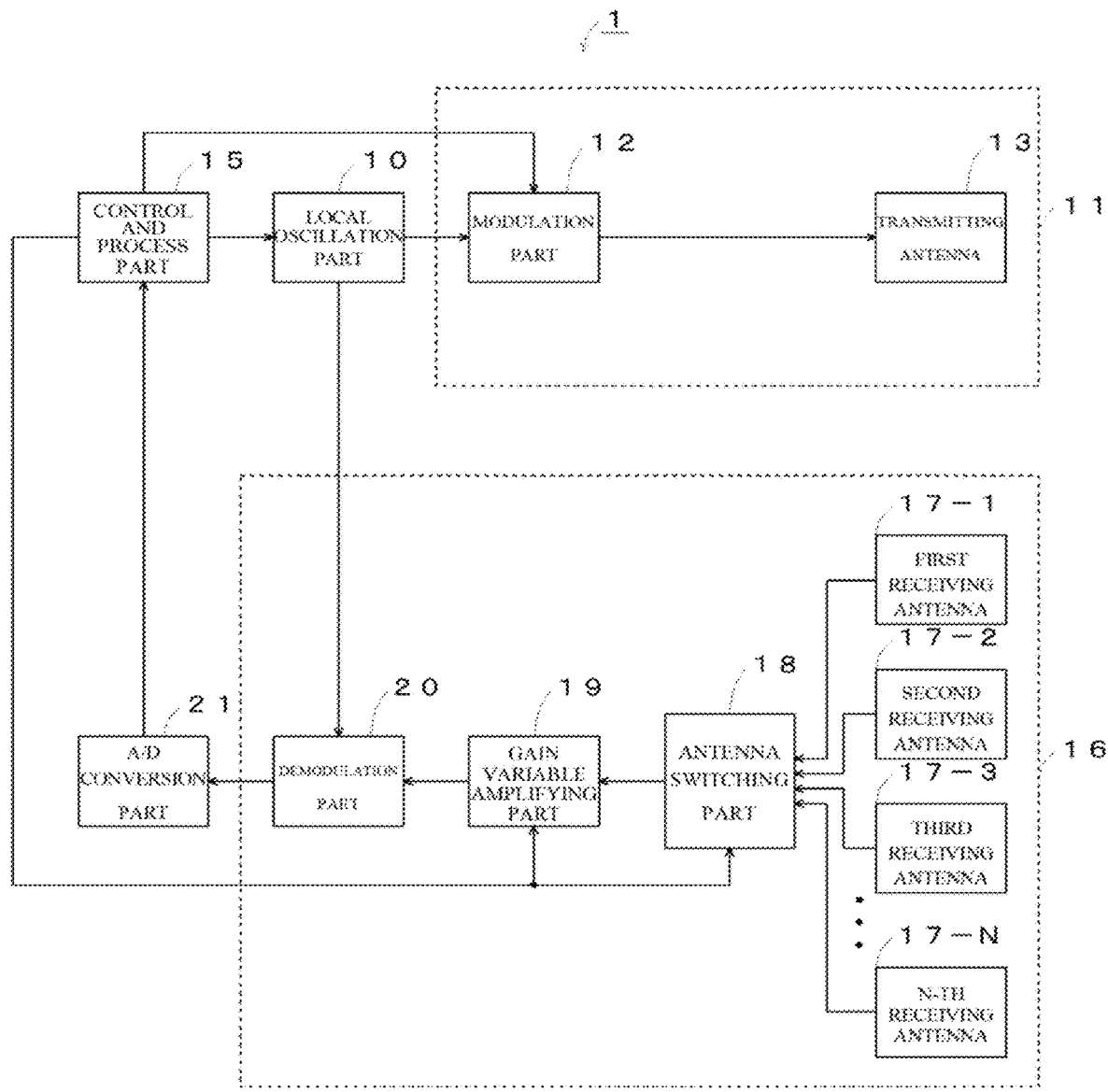
FIG. 1 is a view illustrating a configuration example of a radar device according to a first embodiment of the present invention.

FIG. 1 is a view illustrating a configuration example of a radar device according to a first embodiment of the present invention. As illustrated in this drawing, a radar device 1 according to the first embodiment of the present invention includes a local oscillation part 10, a transmitting part 11, a control and process part 15, a receiving part 16, and an A/D (analog to digital) conversion part 21 as major components.

Here, the local oscillation part 10 generates a CW (continuous wave) signal with a predetermined frequency and supplies to the transmitting part 11 and the receiving part 16.

The transmitting part 11 includes a modulation part 12 and a transmitting antenna 13, pulse-modulates the CW signal supplied from the local oscillation part 10 by the modulation part 12, and transmits toward a target through the transmitting antenna 13.

The modulation part 12 of the transmitting part 11 is controlled by the control and process part 15, and pulse-modulates and outputs the CW signal supplied from the local oscillation part 10. The transmitting antenna 13 transmits the pulse signal supplied from the modulation part 12 toward the target.

The control and process part 15 controls the local oscillation part 10, the modulation part 12, an antenna switching part 18, and a gain variable amplifying part 19, and detects the target by executing a calculation process for received data supplied from the A/D conversion part 21.

Figure 2:
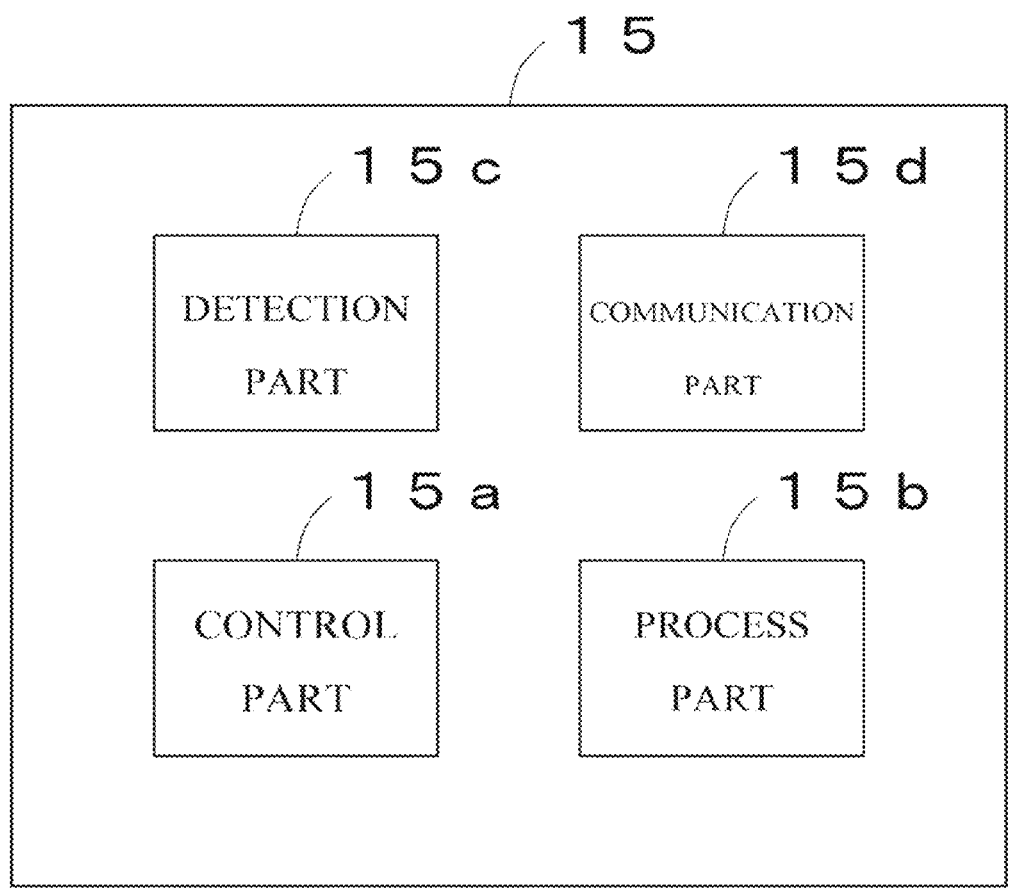
FIG. 2 is a view illustrating a detailed configuration example of a control and process part illustrated in FIG. 1.

FIG. 2 is a block diagram illustrating a detailed configuration example of the control and process part 15 illustrated in FIG. 1. As illustrated in FIG. 2, the control and process part 15 includes a control part 15a, a process part 15b, a detection part 15c, and a communication part 15d. Here, the control part 15a is formed by, for example, a CPU (central processing unit), a ROM (read only memory), a RAM (random access memory), and the like, and controls each part of a device based on data stored in the ROM and RAM. The process part 15b is formed by, for example, a DSP (digital signal processor) or the like, and executes processes for a digital signal supplied from the A/D conversion part 21. The detection part 15c is formed by, for example, a DSP or the like, and executes processes to detect the target. The communication part 15d notifies external devices of a result detected by the detection part 15c.

Return to FIG. 1. The receiving part 16 includes a first receiving antenna 17-1 to an N-th receiving antenna 17-N (N≥2), the antenna switching part 18, the gain variable amplifying part 19, and a demodulation part 20, receives a signal which is transmitted from the transmitting antenna 13 and scattered by the target, performs a demodulation process, and then outputs to the A/D conversion part 21.

The first receiving antenna 17-1 to the N-th receiving antenna 17-N of the receiving part 16 are each formed by N pieces of antenna elements, receive the signal transmitted from the transmitting antenna 13 and scattered by the target, and supply to the antenna switching part 18.

The antenna switching part 18 is controlled by the control part 15a of the control and process part 15, selects any one of the first receiving antenna 17-1 to the N-th receiving antenna 17-N, and supplies the received signal to the gain variable amplifying part 19. Gain of the gain variable amplifying part 19 is controlled by the control part 15a of the control and process part 15, and the gain variable amplifying part 19 amplifies the received signal supplied from the antenna switching part 18 with a predetermined gain to output to the demodulation part 20. The demodulation part 20 demodulates and outputs the received signal supplied from the gain variable amplifying part 19 by using the CW signal supplied from the local oscillation part 10.

The A/D conversion part 21 samples the received signal supplied from the demodulation part 20 at a predetermined cycle, converts into a digital signal, and supplies to the control and process part 15.

Figure 3:
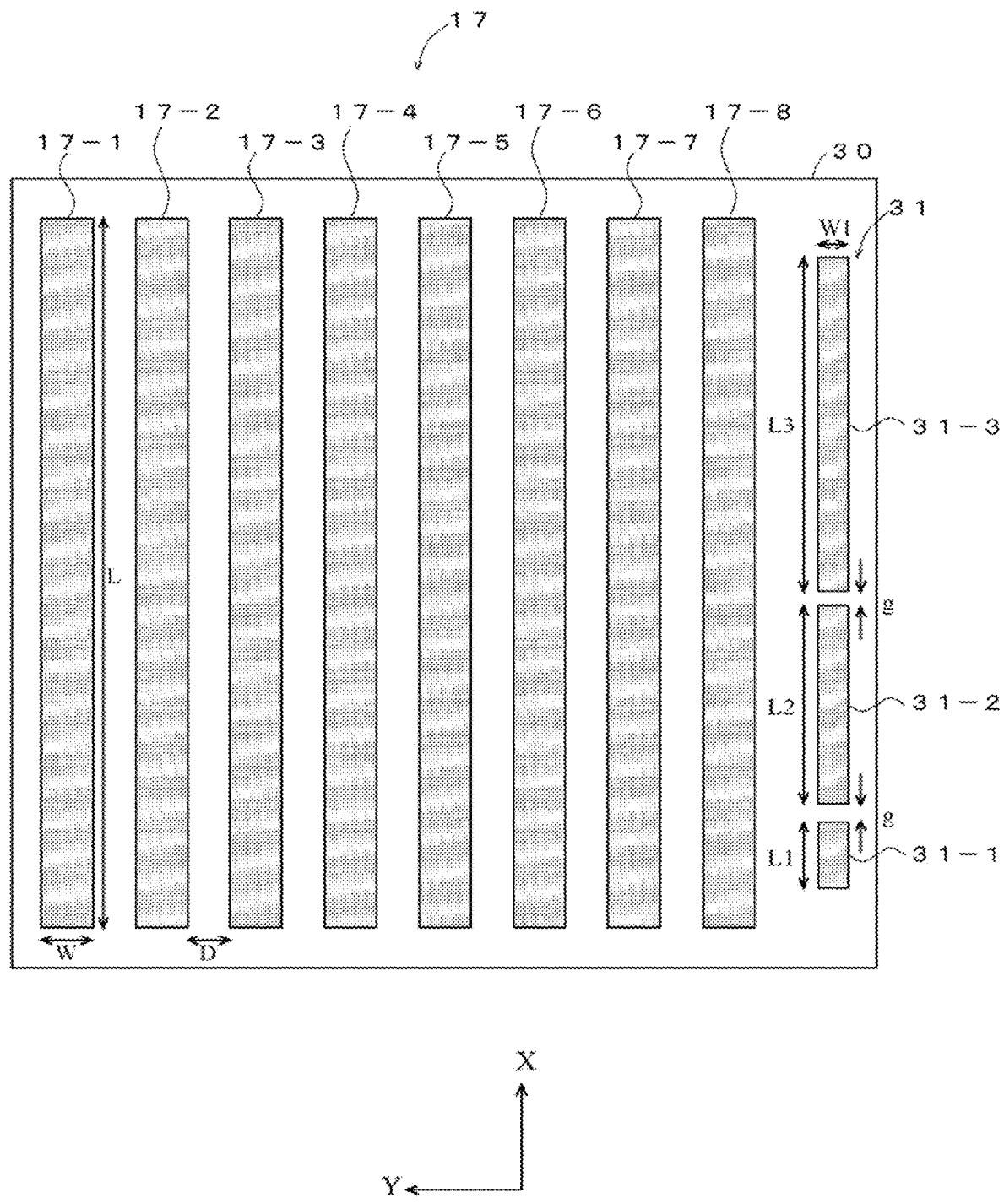
FIG. 3 is a view illustrating a configuration example of a receiving antenna array of the radar device illustrated in FIG. 1.

FIG. 3 is a view illustrating a more detailed configuration example of the first receiving antenna 17-1 to the N-th receiving antenna 17-N. In the example in FIG. 3, the first receiving antenna 17-1 to an eighth receiving antenna 17-8 are disposed to exemplify the case when N=8. The first receiving antenna 17-1 to the eighth receiving antenna 17-8 form a receiving array antenna 17. As illustrated in FIG. 3, the first receiving antenna 17-1 to the eighth receiving antenna 17-8 each have a predetermined length L in a longitudinal direction in FIG. 3, and a width W (W<L) in a left-right direction. The first receiving antenna 17-1 to the eighth receiving antenna 17-8 are each disposed on a board surface of a circuit board 30 with a distance D. Resonant elements 31-1 to 31-3 forming the dispersion part 31 are disposed at a right-hand neighbor of the eighth receiving antenna 17-8. Lengths of the resonant elements 31-1 to 31-3 are respectively L1 to L3 (L1<L2<L3), and each width is W1.

(B) Explanation of Operations of First Embodiment

Figure 4:
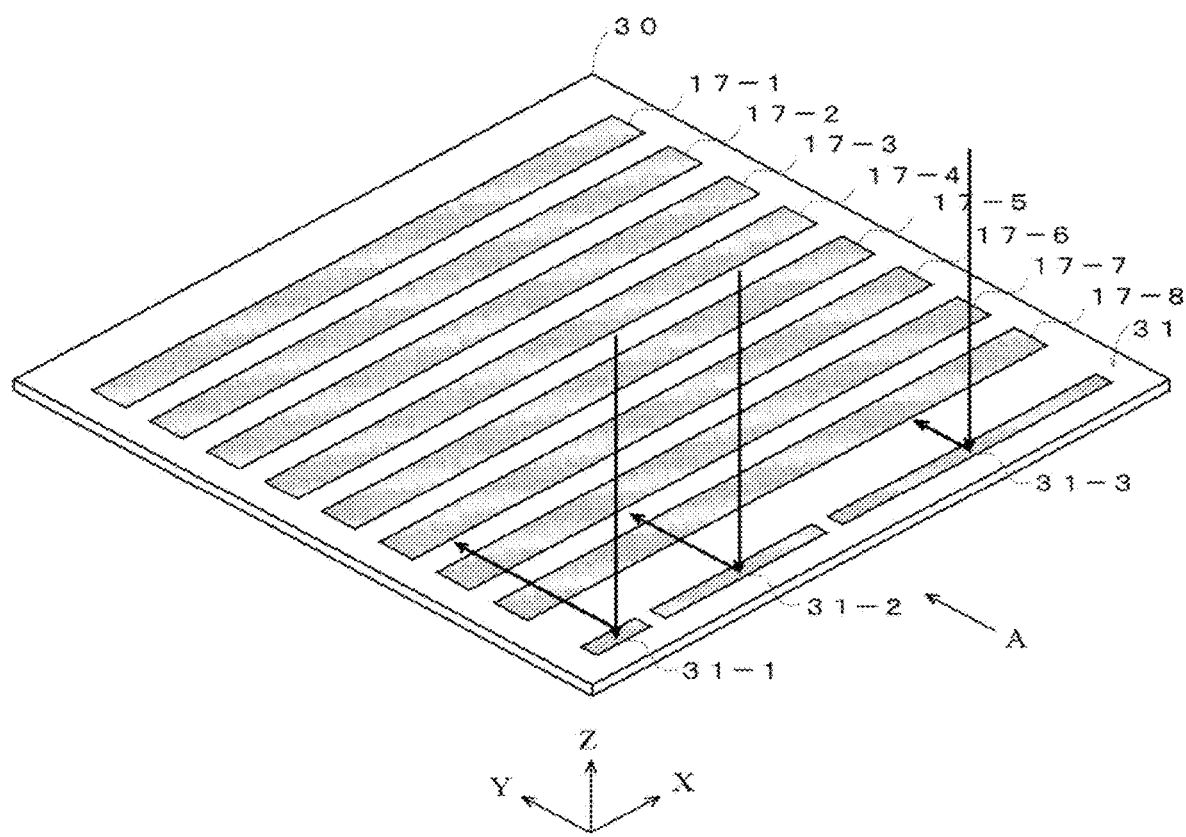
FIG. 4 is a perspective view of the receiving antenna array illustrated in FIG. 3.
Figure 5:
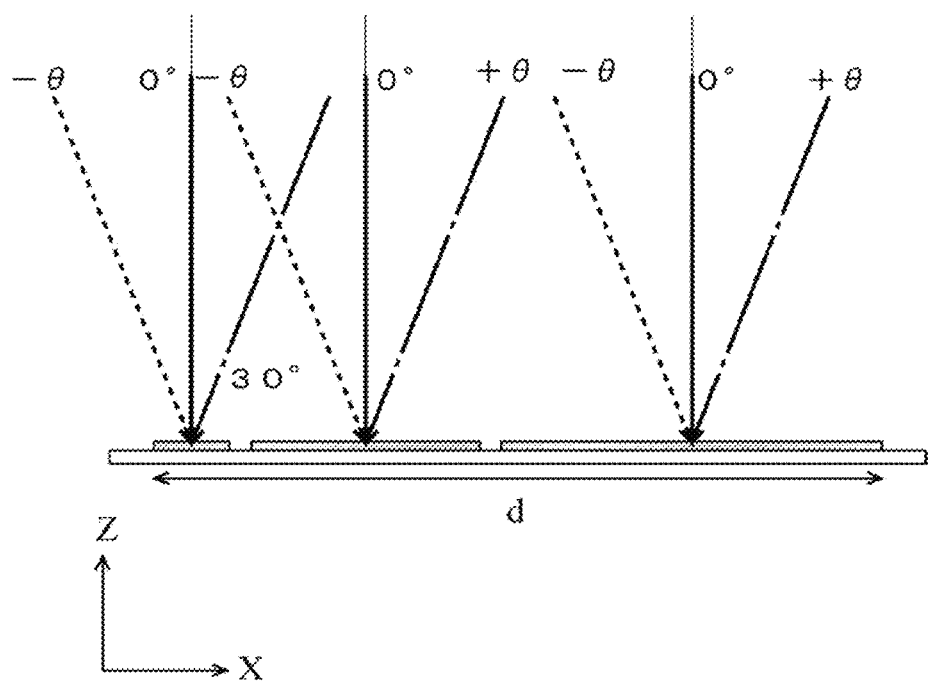
FIG. 5 is a view when the view illustrated in FIG. 4 is seen from an arrow A direction.

Next, operations of the first embodiment of the present invention are explained. FIG. 4 is a view to explain the operations of the first embodiment. As illustrated at a lower part of FIG. 4, a left-right direction of the circuit board 30 (the left-right direction in FIG. 3) is set as a Y-axis, a longitudinal direction of the circuit board 30 (the longitudinal direction in FIG. 3) is set as an X-axis, and a normal direction of the circuit board 30 is set as a Z-axis. In FIG. 4, a scattered wave from a non-illustrated target is assumed to be incident from an upper direction of the Z-axis as indicated by solid lines. In more detail, a state where the circuit board 30 is seen from a direction of an arrow A in FIG. 4 is illustrated in FIG. 5. In FIG. 5, thick solid lines which are incident from the same direction as the normal lines indicated by thin solid lines (the normal lines to the board surface of the circuit board 30) indicate an incident direction of the scattered wave in FIG. 4.

The dispersion part 31 is formed by the three resonant elements 31-1 to 31-3. Here, the resonant element 31-2 is an element whose resonant frequency is a frequency f2 which is almost the same as a frequency of the radio wave transmitted from the radar device 1. The resonant element 31-1 is an element whose resonant frequency is a frequency f1 which is higher than the frequency of the radio wave transmitted from the radar device 1. The resonant element 31-3 is an element whose resonant frequency is a frequency f3 which is lower than the frequency of the radio wave transmitted from the radar device 1. That is, the frequencies are set to be f1>f2>f3.

When the scattered wave at the same angle as the normal direction is incident on the dispersion part 31 as indicated by the solid lines in FIG. 5, the incident wave is reflected in various directions by the dispersion part 31. However, when the radio waves reflected in the direction of the first receiving antenna 17-1 to the eighth receiving antenna 17-8 are focused, these radio waves are reflected at an approximately right angle to the normal lines as indicated by the solid lines in FIG. 4 to be incident on the first receiving antenna 17-1 to the eighth receiving antenna 17-8.

At this time, since the resonant elements 31-1 to 31-3 forming the dispersion part 31 have different resonant frequencies, dispersion properties, that is, propagation velocities depending on a frequency change. In more detail, since the radio wave reflected by the resonant element 31-1 has the faster propagation velocity at the reflected time compared to the radio wave reflected by the resonant element 31-3, a phase of the radio wave reflected by the resonant element 31-1 advances compared to a phase of the radio wave reflected by the resonant element 31-3. As a result, the phases advance in an order of the resonant element 31-1, the resonant element 31-2, and the resonant element 31-3 as schematically illustrated in FIG. 4. At this time, a phase difference between the resonant element 31-1 and the resonant element 31-3 is represented by $\Delta\Phi$.

Next, when an incident angle of each scattered wave is set in a minus direction of the X-axis for an angle θ with respect to the normal line (when the incident angle is set as −θ) as indicated by the dotted lines in FIG. 5, and the phase difference between the scattered wave incident on the resonant element 31-1 and the scattered wave incident on the resonant element 31-3 is set as $\Delta\varphi$, $\Delta\varphi$ can be expressed by the following expression (1). In the expression (1), d represents a length of the dispersion part 31 in the X-axis direction, and λ represents a wavelength of the scattered wave.

$$\Delta\varphi = 2\pi d/\lambda \cdot \sin\theta \quad (1)$$

Figure 6:
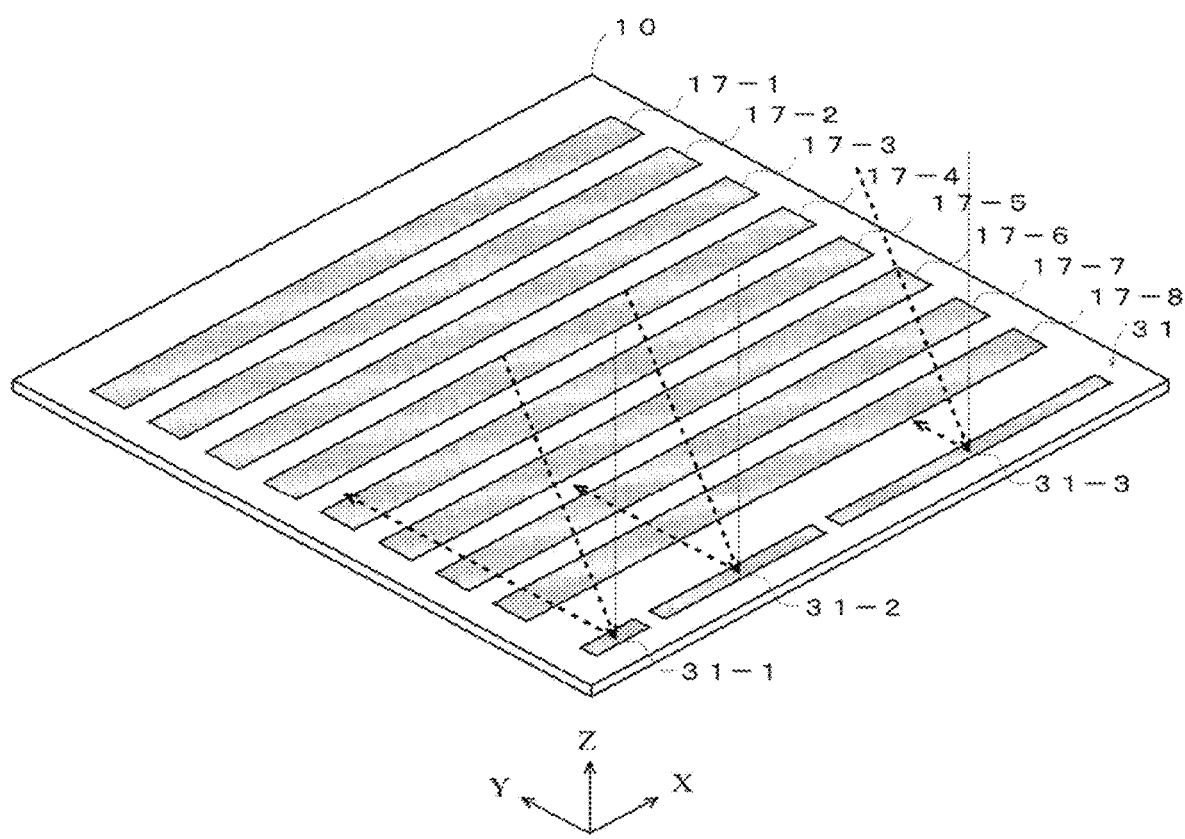
FIG. 6 is a perspective view of the receiving antenna array illustrated in FIG. 3.

In this case, the phase difference of the radio wave emitted from the dispersion part 31 becomes a value where the phase difference Δφ generated at the incident time and the phase difference Δφ due to the dispersion are added. Accordingly, the radio wave emitted from the dispersion part 31 becomes a state where the phase of the radio wave emitted from the resonant element 31-1 further advances from the phase of the radio wave emitted from the resonant element 31-3 as schematically indicated by dotted lines in FIG. 6.

Next, as indicated by dot and dash lines in FIG. 5, when the incident angle of the scattered wave is set in a plus direction of the X-axis for the angle θ with respect to the normal line (when the incident angle is set as +θ), the phase difference between the scattered wave incident on the resonant element 31-1 and the scattered wave incident on the resonant element 31-3 is set as Δφ, Δφ can be expressed by the following expression (2).

$$\Delta\varphi = -2\pi d/\lambda \cdot \sin\theta \quad (2)$$

Figure 7:
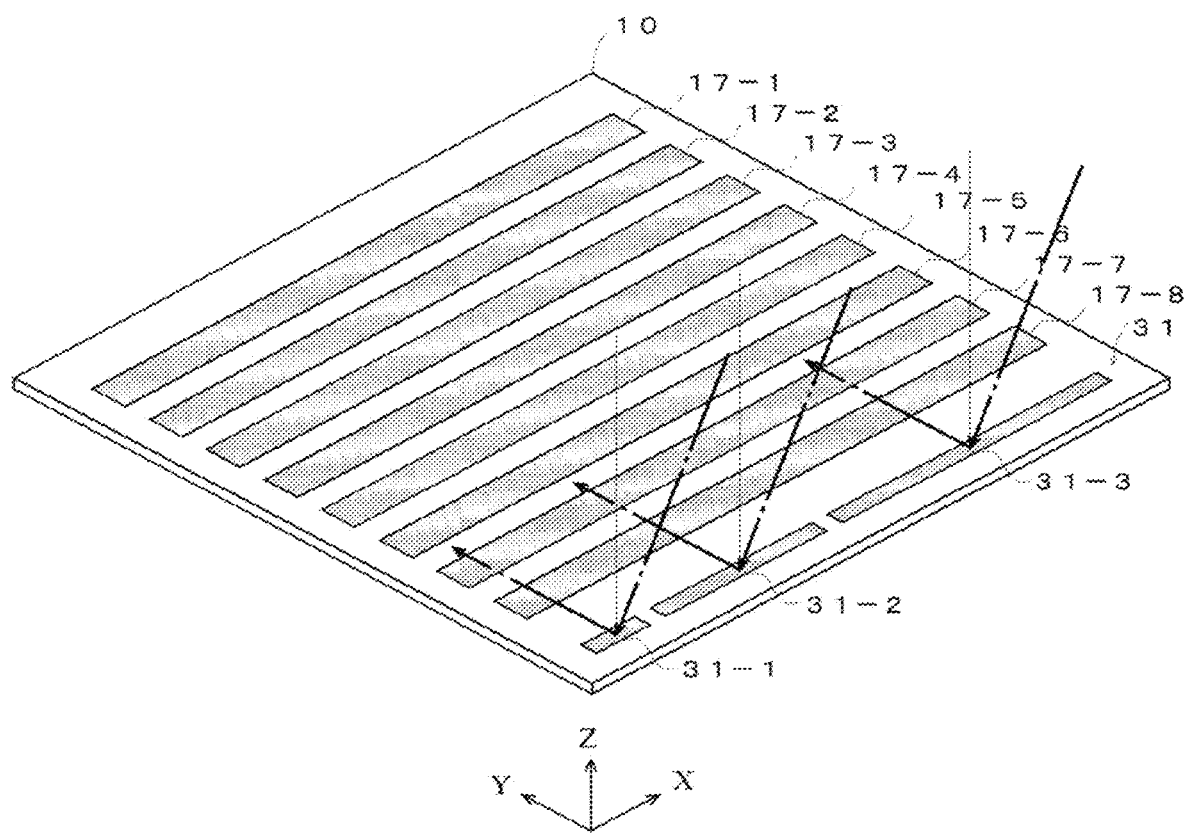
FIG. 7 is a perspective view of the receiving antenna array illustrated in FIG. 3.

At this time, if the phase difference Δφ generated at the incident time and the phase difference ΔΦ due to the dispersion are the same phase difference (−Δφ=ΔΦ), the result of addition of them becomes "0" (zero), resulting in that the phases of the radio waves emitted from the resonant element 31-1 to the resonant element 31-3 become almost the same state as schematically indicated by dot and dash lines in FIG. 7.

Figure 8:
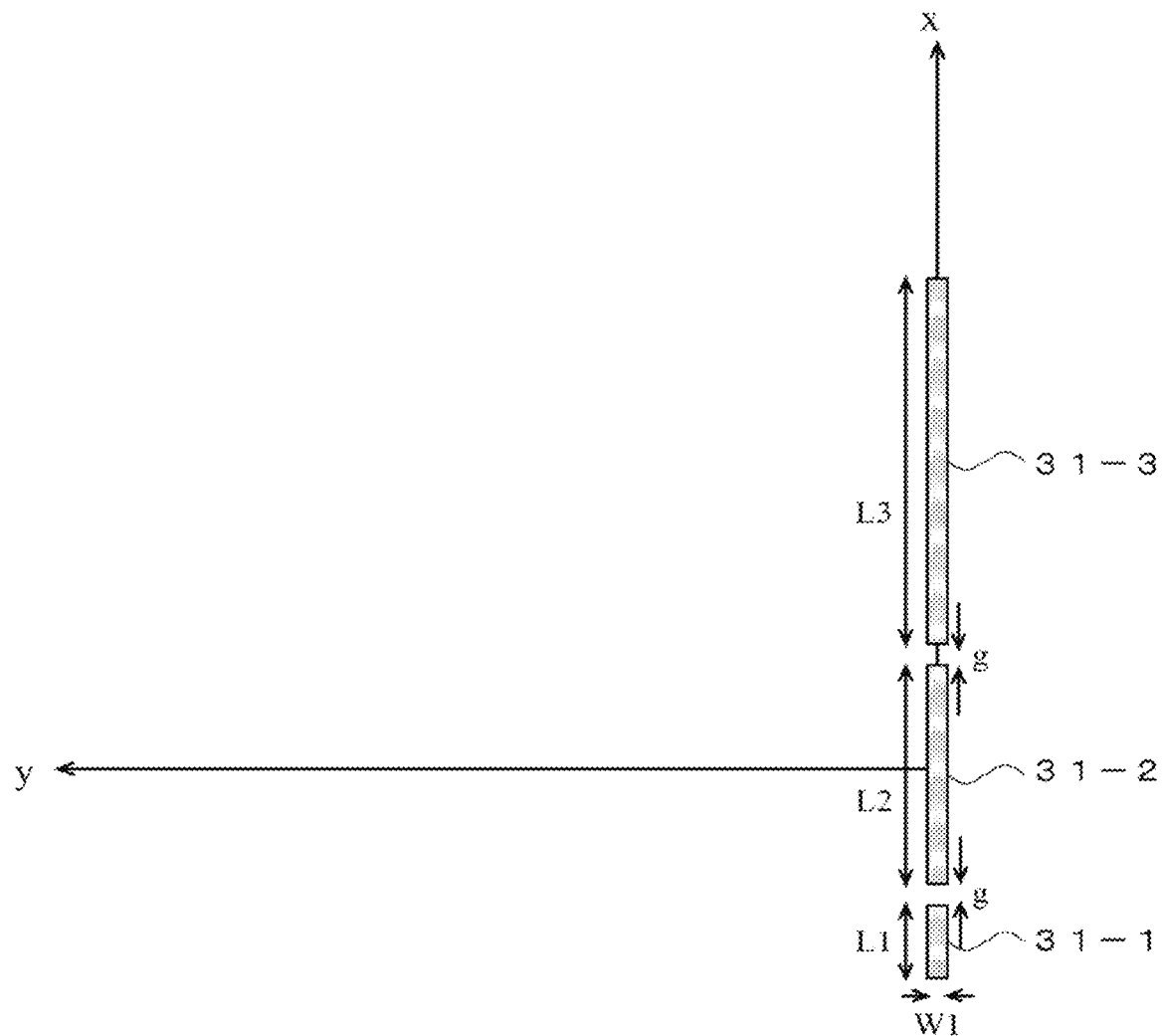
FIG. 8 is a view illustrating coordinate axes when a simulation of a dispersion part illustrated in FIG. 3 is performed.
Figure 9:
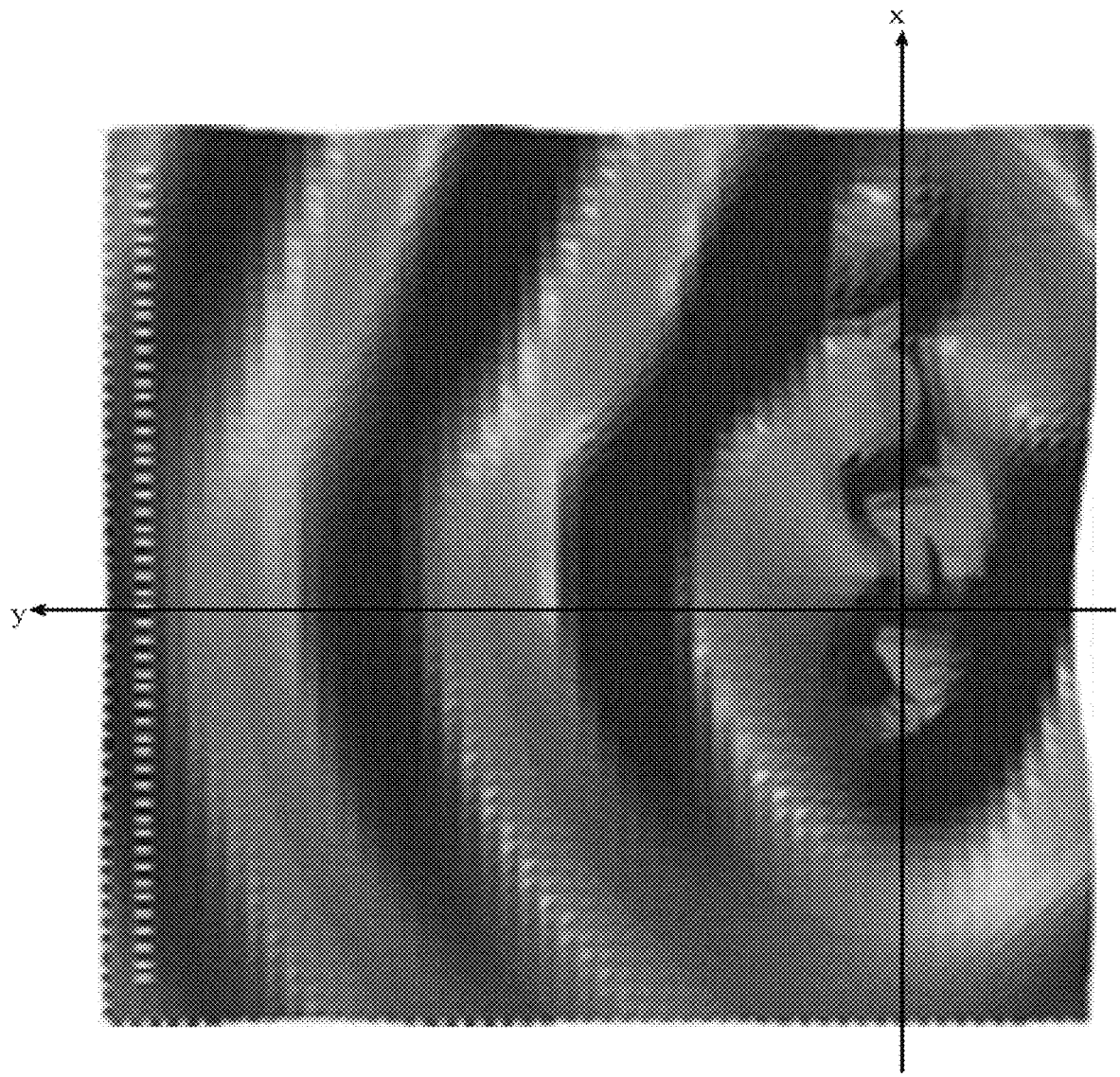
FIG. 9 is a view illustrating a simulation result of a reflection pattern of a radio wave incident on the dispersion part illustrated in FIG. 3.
Figure 10:
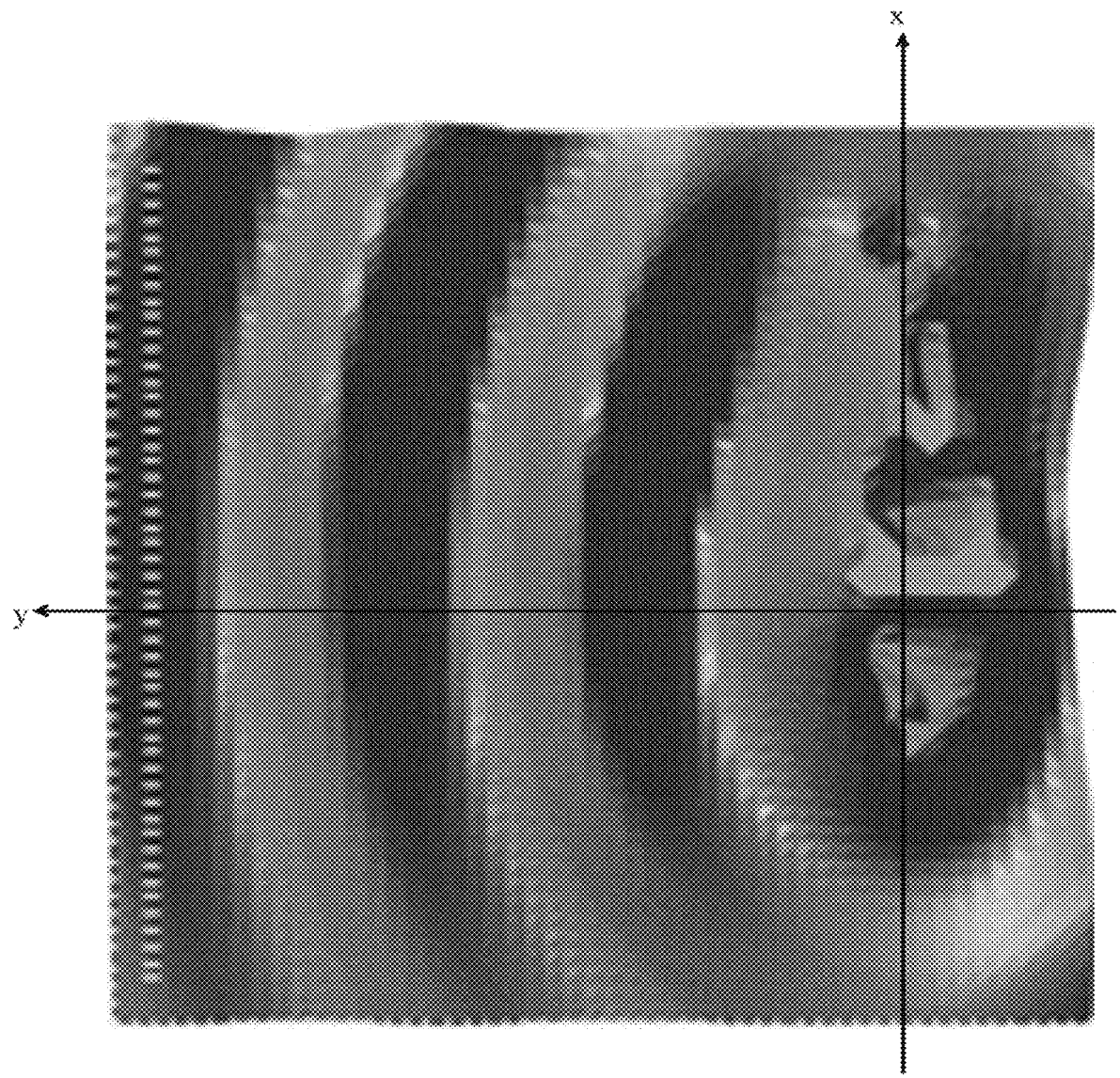
FIG. 10 is a view illustrating a simulation result of a reflection pattern of the radio wave incident on the dispersion part illustrated in FIG. 3.
Figure 11:
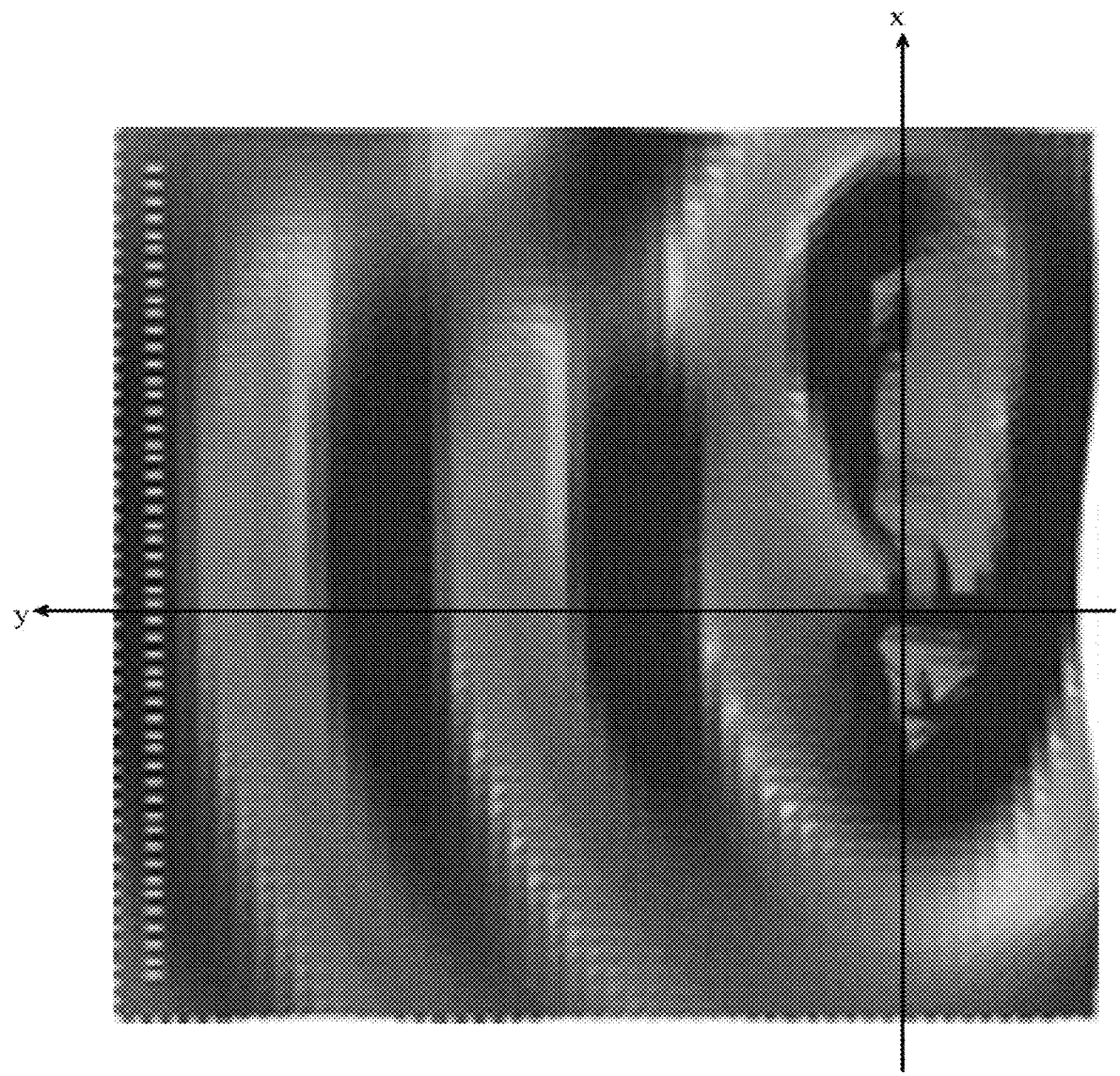
FIG. 11 is a view illustrating a simulation result of a reflection pattern of the radio wave incident on the dispersion part illustrated in FIG. 3.

FIG. 9 to FIG. 11 are views each illustrating a result where a state of the radio wave reflected by the dispersion part 31 was simulated while changing the incident angle of the scattered wave to −30°, 0°, 30° when an x-axis and a y-axis were set for the dispersion part 31 as illustrated in FIG. 8. In more detail, the x-axis is set at a center of the resonant elements 31-1 to 31-3 of the dispersion part 31, and the y-axis is set at a center of the resonant element 31-2 as illustrated in FIG. 8. Lengths L1 to L3 of the resonant elements 31-1 to 31-3 are respectively set to L1=2 mm, L2=6 mm, and L3=10 mm, a gap g between elements among the resonant elements 31-1 to 31-3 is set as 1 mm, and the frequency of the scattered wave is set as 24 GHz.

FIG. 9 is a view illustrating the state of the radio wave reflected by the dispersion part 31 when θ=30° is set as the incident angle of −θ (the incident angle of −30°indicated by the dotted lines in FIG. 5. FIG. 10 is a view illustrating a state of the radio wave reflected by the dispersion part 31 when the incident angle is set at 0° indicated by the thick solid lines in FIG. 5. FIG. 11 is a view illustrating the state of the radio wave reflected by the dispersion part 31 when θ=30° is set as the incident angle of +θ (the incident angle of +30°) indicated by the dot and dash lines in FIG. 5.

As a result of comparison among FIG. 9 to FIG. 11, the phases of the radio waves each illustrated by dark and light in the view are in the following states: in FIG. 9, the phase of the radio wave reflected by the resonant element 31-3 delays compared to that of the resonant element 31-1, but in FIG. 11, the phases of the radio waves reflected by the resonant element 31-1 and the resonant element 31-3 become almost the same state.

The first receiving antenna 17-1 to the eighth receiving antenna 17-8 each input the reflected waves illustrated in FIG. 9 to FIG. 11. Here, the first receiving antenna 17-1 to the eighth receiving antenna 17-8 each have the length L in the X-axis direction, and an electrical signal output from each of them becomes a value obtained by integrating the radio wave in the length L direction.

When the radio wave emitted from the dispersion part 31 is in the state illustrated in FIG. 11, the value obtained by integrating the radio wave becomes a predetermined value in accordance with the phase at that time because the phases of the radio waves at each of the first receiving antenna 17-1 to the eighth receiving antenna 17-8 are almost the same. Meanwhile, when the radio wave emitted from the dispersion part 31 is in the state illustrated in FIG. 9, the value obtained by integrating the radio wave becomes a value smaller than that in the case of FIG. 11 because the phases of the radio waves at each of the first receiving antenna 17-1 to the eighth receiving antenna 17-8 are shifted.

Figure 12:
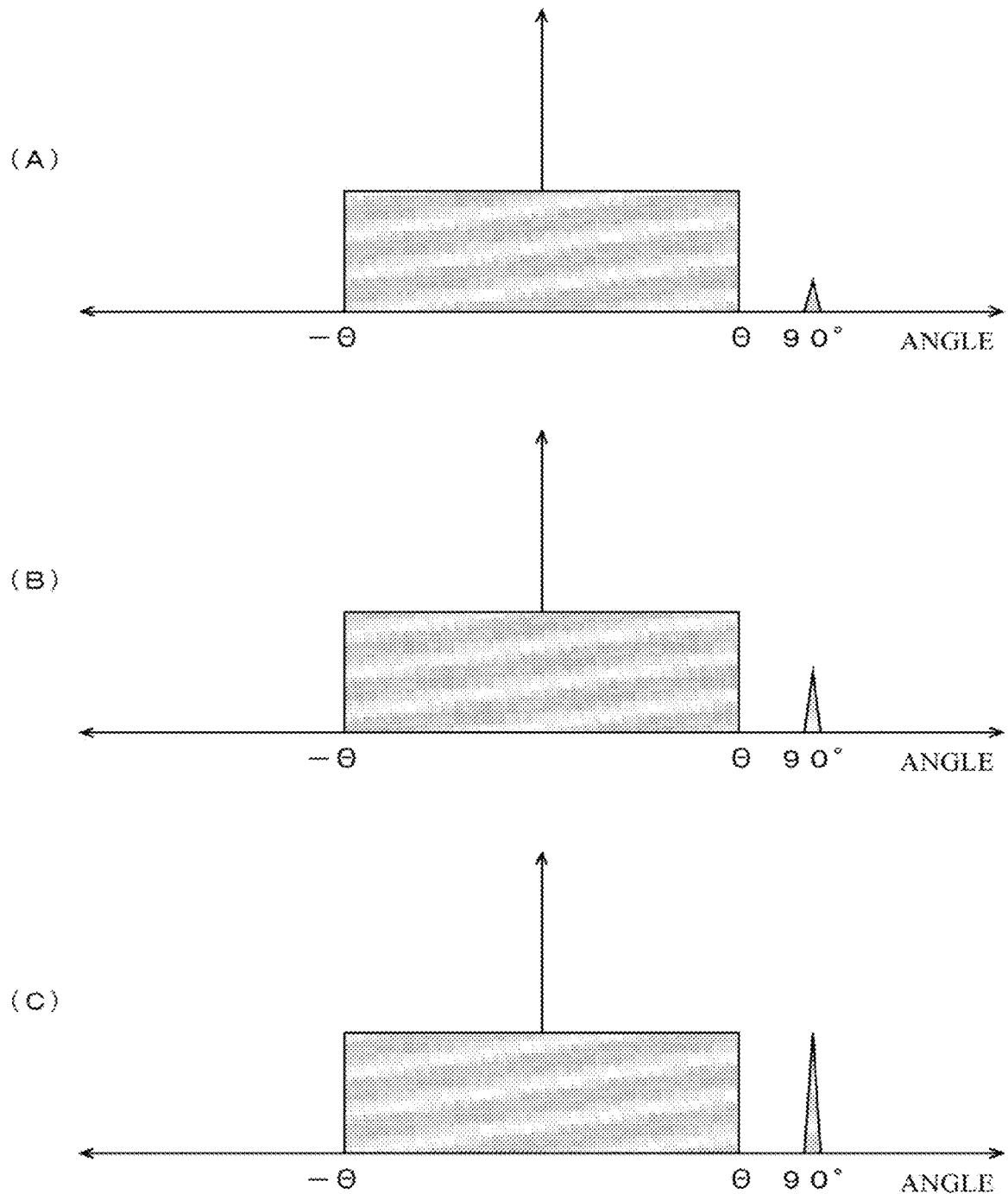
FIG. 12 are views each illustrating a relation between an incident angle of a radio wave and a received signal in the first embodiment.

FIG. 12 illustrate examples of signals detected by the radar device 1 in FIG. 9 to FIG. 11. In more detail, FIG. 12(A) illustrates the signals detected under the state illustrated in FIG. 9. In FIG. 12(A), a horizontal axis represents an angle in the Y-axis direction (an angle where the normal direction is set as 0°, the Y-axis plus side is set as a minus, and the Y-axis minus side is set as a plus), and a vertical axis represents a level of the signal. In each of FIG. 12, a range of −Θ to Θ shows a normal detection range (for example, −60° to +60°), and 90° shows a signal reflected by the dispersion part 31. In FIG. 12(A), since the phases of the signals reflected by the dispersion part 31 are not uniform, the level of the detected signal becomes low. Meanwhile, in FIG. 12(C), since the phases of the signals reflected by the dispersion part 31 are uniform, the level of the detected signal becomes high. In FIG. 12(B), the detected signal is an intermediate between FIG. 12(A) and FIG. 12(C). It may be set such that a constant output is generated only in the case of FIG. 12(C), and output is seldom generated in both of FIGS. 12(A), (B).

In the first embodiment of the present invention, when the target is detected in the range of −Θ to Θ, the level of the signal incident from the dispersion part 31, that is, the signal incident from the angle of 90° is referred to, and it is determined that the target exists in the plus direction illustrated in FIG. 5 when the level of the signal is larger than a predetermined threshold value Th2. When the target is detected in the range of −Θ to Θ, it is determined that the target exists in the minus direction illustrated in FIG. 5 when the level of the signal incident from the angle of 90° is smaller than a predetermined threshold value Th1. Further, when the target is detected in the range of −Θ to Θ, it is determined that the target exists in the direction of 0° illustrated in FIG. 5 when the level of the signal incident from the angle of 90° is larger than the predetermined threshold value Th1 and smaller than the threshold value Th2. It goes without saying that all of the three cases illustrated in FIG. 5 may not be detected but, for example, only the plus direction may be detected.

Next, detailed operations of the first embodiment of the present invention are explained. In the following, it is explained while exemplifying a case when the radar device 1 is attached to, for example, a vehicle such as an automobile. As an attaching method, the radar device 1 is attached such that the X-axis of the circuit board 30 illustrated in FIG. 3 is a longitudinal (vertical) direction of the vehicle, and the Y-axis is a left-right (horizontal) direction of the vehicle. Further, it is attached such that the resonant element 31-3 is located in an upper direction of the vehicle, and the resonant element 31-1 is located in a lower direction of the vehicle.

When the vehicle is in operation, the control and process part 15 controls the modulation part 12, and makes the transmitting antenna 13 transmit a pulse wave. The pulse wave transmitted from the transmitting antenna 13 is scattered by the target, and received by the first receiving antenna 17-1 to the eighth receiving antenna 17-8. The pulse wave scattered by the target is dispersed by the dispersion part 31 illustrated in FIG. 3, and then received by the first receiving antenna 17-1 to the eighth receiving antenna 17-8.

The control and process part 15 controls the antenna switching part 18, sequentially selects signals received by the first receiving antenna 17-1 to the eighth receiving antenna 17-8, and supplies to the gain variable amplifying part 19. The gain variable amplifying part 19 amplifies the signal supplied from the antenna switching part 18, and supplies to the demodulation part 20. The demodulation part 20 demodulates the signal supplied from the gain variable amplifying part 19, and supplies to the A/D conversion part 21. The A/D conversion part 21 converts the analog signal supplied from the demodulation part 20 into a digital signal, and supplies to the control and process part 15.

The control and process part 15 executes an analyzing process for the digital signal supplied from the A/D conversion part 21, and detects a target. For example, when the target is another vehicle driving in front of an own vehicle (when the target has the same height as the own vehicle), a reflected wave from the target is incident at the angle illustrated in FIG. 4 (the angle of the solid lines illustrated in FIG. 5). In this case, the target is detected in the range of −Θ to Θ illustrated in FIG. 12, and the signal at the level as illustrated in FIG. 12(B) is detected at the position of 90°. The control and process part 15 detects another vehicle being the target by performing a clustering process and a tracking process for the signal corresponding to the target detected in the range of −Θ to Θ, and determines that the target exists at the same height as the own vehicle from the level of the signal at the position of 90°.

For example, a case is assumed when a bridge exists above a road, and this bridge is detected as a target. In this case, since a scattered wave from the target is incident from the +θ direction illustrated in FIG. 5, the bridge being the target is detected in the range of −Θ to Θ shown in each of FIG. 12, and the signal at the level as illustrated in FIG. 12(C) is detected at the position of 90°. The control and process part 15 performs the clustering process and the tracking process for the signal corresponding to the target detected in the range of −Θ to Θ to detect the bridge being the target, and determines that the target exists at a position higher than the own vehicle from the level of the signal at the position of 90°. In such a case, a warning is not issued because the bridge and the vehicle do not collide.

Further, a case is assumed when for example, the vehicle approaches a downslope, and a frontward road is detected as a target. In this case, since a scattered wave from the target is incident from the −θ direction illustrated in FIG. 5, the road being the target is detected in the range of −Θ to Θ shown in each of FIG. 12, and a signal at the level illustrated in FIG. 12(A) is detected at the position of 90°. The control and process part 15 performs the clustering process and the tracking process for the signal corresponding to the target detected in the range of −Θ to Θ to detect the road being the target, and determines that the target exists at a position lower than the own vehicle from the level of the signal at the position of 90°. In such a case, a warning is not issued because the road and the vehicle do not collide.

As explained hereinabove, in the first embodiment of the present invention, the dispersion part 31 is provided in the vicinity of the first receiving antenna 17-1 to the eighth receiving antenna 17-8, the level of the signal appeared at the position of 90° is detected as a result of analyzation of the received signal, and thereby, the position of the target in the height direction can be detected. It is thereby possible to exclude the bridge existing at the higher position than the own vehicle and the sloping road existing at the lower position from collision targets.

When the target is not the downslope, a degree of the height of the target may be estimated by referring to the level of the signal appeared at the position of 90°. For example, when a truck or the like drives in front of the vehicle, the level of the signal appeared at the position of 90° becomes large compared to the case when only a reflected wave from the higher position is received because reflected waves from the same position and the lower position are received in addition to the reflected wave from the higher position compared to the own vehicle. Accordingly, a size in the height direction may be determined by comparing the level of the signal appeared at the position of 90° and a threshold value. When a strong reflected wave is received only from an upper direction, it can be determined as a road sign or the like. When reflected waves from the same position and the lower position are received, it can be determined as a target in a middle size (for example, a general vehicle or a pedestrian). When a reflected wave only from the same position is received, it can be determined as, for example, a guardrail. Further, when a reflected wave only from the lower position is received, it can be determined as, for example, a curb or a sidewalk.

Figure 13:
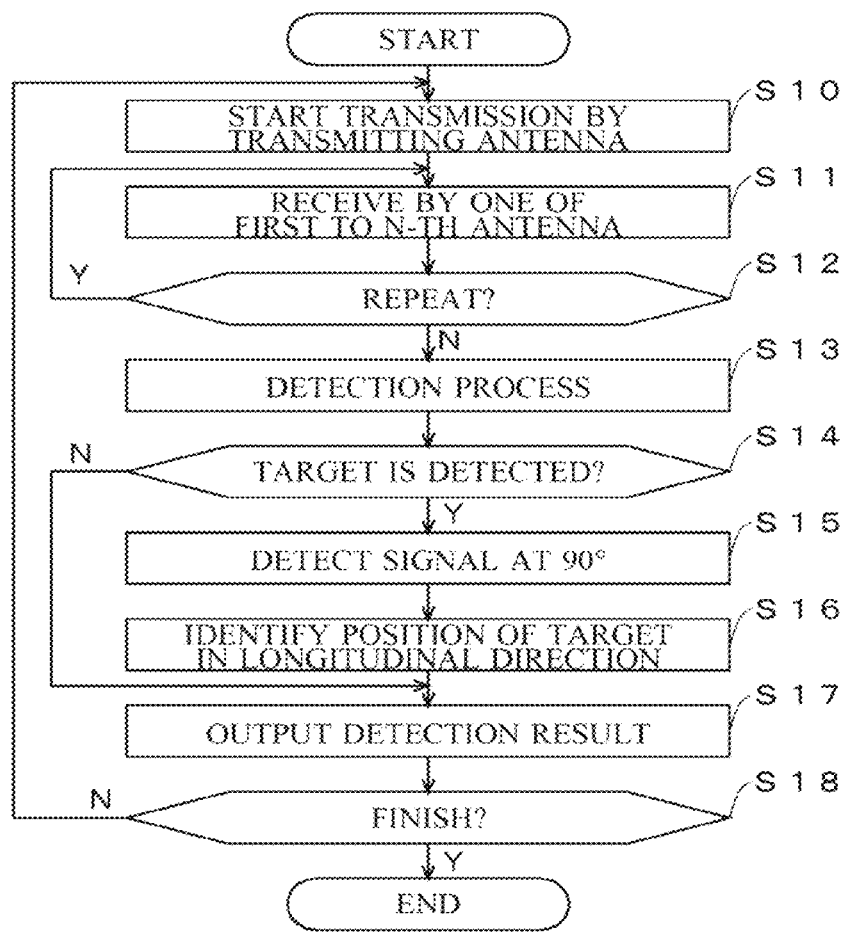
FIG. 13 is a flowchart to explain an example of processes executed in the first embodiment.

Next, processes executed in the first embodiment are explained. FIG. 13 is a flowchart to explain the flow of the processes executed in the first embodiment. When the processes of the flowchart illustrated in FIG. 13 are started, the following steps are executed.

In Step S10, the control part 15*a* of the control and process part 15 controls the modulation part 12, and makes start transmission of a pulse signal from the transmitting antenna 13. As a result, the pulse wave transmitted from the transmitting antenna 13 is scattered by a target, incident on the first receiving antenna 17-1 to the N-th receiving antenna 17-N, and incident on the first receiving antenna 17-1 to the N-th receiving antenna 17-N after being reflected by the dispersion part 31.

In Step S11, the control part 15*a* of the control and process part 15 controls the antenna switching part 18, and supplies the signal received by any one of the first receiving antenna 17-1 to the N-th receiving antenna 17-N to the gain variable amplifying part 19.

In Step S12, the control part 15*a* of the control and process part 15 determines whether reception by all of the first receiving antenna 17-1 to the N-th receiving antenna 17-N are finished, and when the reception by all antennas are not finished and it is determined to repeat the process (Step S12: Y), the process returns to Step S11 to repeat the similar process, and in other cases (Step S12: N), the process proceeds to Step S13.

In Step S13, the detection part 15*c* of the control and process part 15 executes a detection process of the target based on the received signals received by repeated processes of Step S10 to Step S12. Concretely, the target is detected through the clustering process and the tracking process.

In Step S14, when it is determined that the detection part 15*c* of the control and process part 15 detects the target as a result of the detection process of Step S13 (Step S14: Y), the process proceeds to Step S15, and in other cases (Step S14: N), the process proceeds to Step S17.

In Step S15, the detection part 15c of the control and process part 15 detects the signal at 90° as the result of the detection process of Step S13.

In Step S16, the detection part 15c of the control and process part 15 detects the position of the target in the longitudinal direction (vertical direction) based on the signal level at 90° detected in Step S15. In more detail, it is determined that the target exists above the own vehicle when the signal level at 90° is larger than the predetermined threshold value Th2, it is determined that the target exists below the own vehicle when the signal level at 90° is larger than the predetermined threshold value Th1 (Th1<Th2), and it is determined that the target exists at the same height as the own vehicle when the signal level is the threshold value Th1 or more and the threshold value Th2 or less.

In Step S17, the communication part 15d of the control and process part 15 outputs a detection result of the target to other devices (for example, an ECU (electric control unit) or the like).

In Step S18, the control part 15a of the control and process part 15 determines whether the process is to be finished, and when it is determined to continue the process (Step S18: N), the process returns to Step S10 to repeat the similar processes as stated above, and in other cases (Step S18: Y), the process is finished.

As it is explained hereinabove, according to the processes in FIG. 13, it is possible to detect the position of the target in the viewing angle direction and the position of the target in the longitudinal direction.

(C) Explanation of Configuration of Second Embodiment

Figure 14:
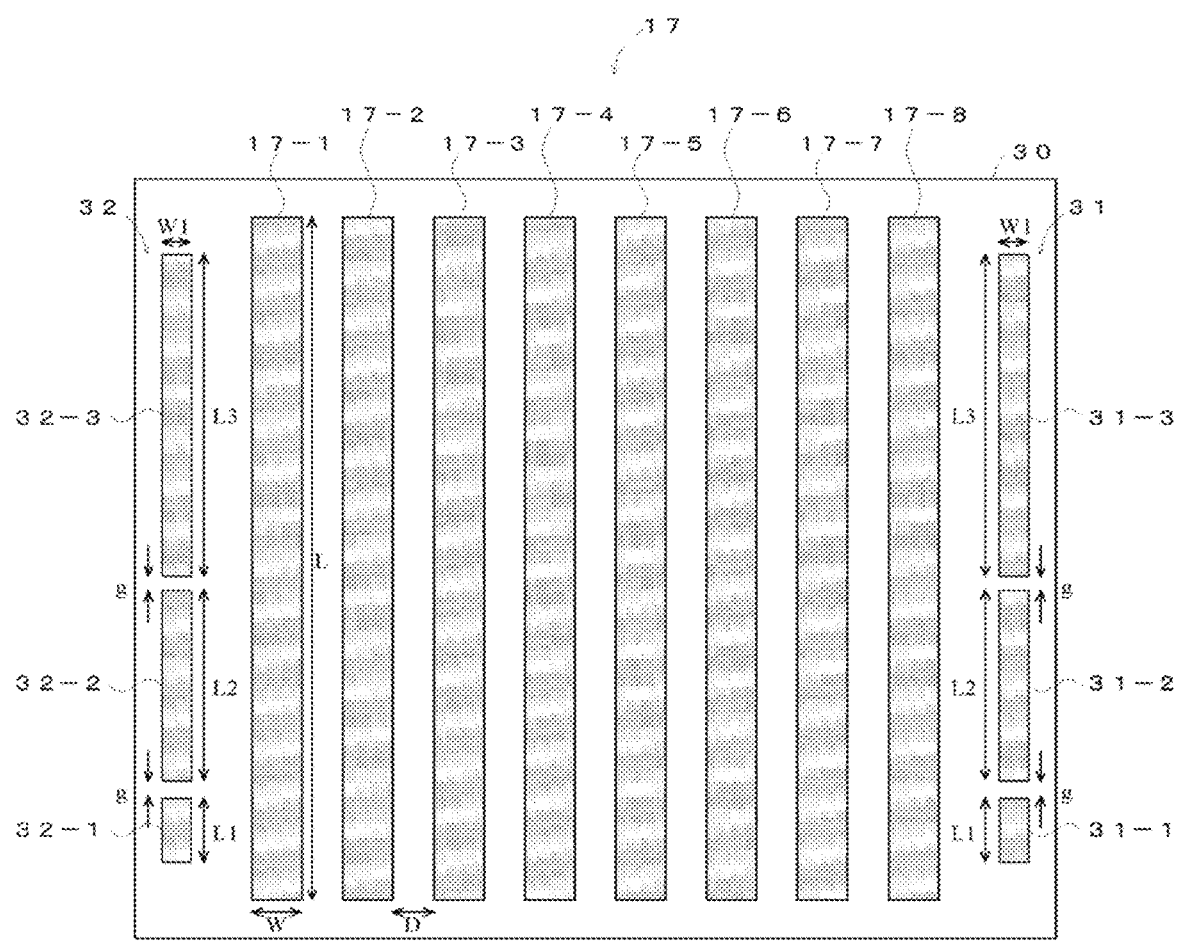
FIG. 14 is a view illustrating a configuration example of a second embodiment.

Next, a second embodiment of the present invention is explained. In the second embodiment, the configurations illustrated in FIG. 1 and FIG. 2 are the same as the first embodiment, but a configuration of a dispersion part illustrated in FIG. 14 is different. In an example illustrated in FIG. 14, a dispersion part 32 is added in addition to the dispersion part 31 compared to FIG. 3. Other configurations are the same as FIG. 3.

The dispersion part 32 is provided in the vicinity of the first receiving antenna 17-1 and includes resonant elements 32-1 to 32-3. The resonant elements 32-1 to 32-3 have similar configurations as the resonant elements 31-1 to 31-3. That is, the resonant element 32-1 has the rectangular structure with the width W1 and the length L1, the resonant element 32-2 has the rectangular structure with the width W1 and the length L2, and the resonant element 32-3 has the rectangular structure with the width W1 and the length L3. The resonant elements 32-1 to 32-3 are each disposed with the gap g.

(D) Explanation of Operations of Second Embodiment

Figure 15:
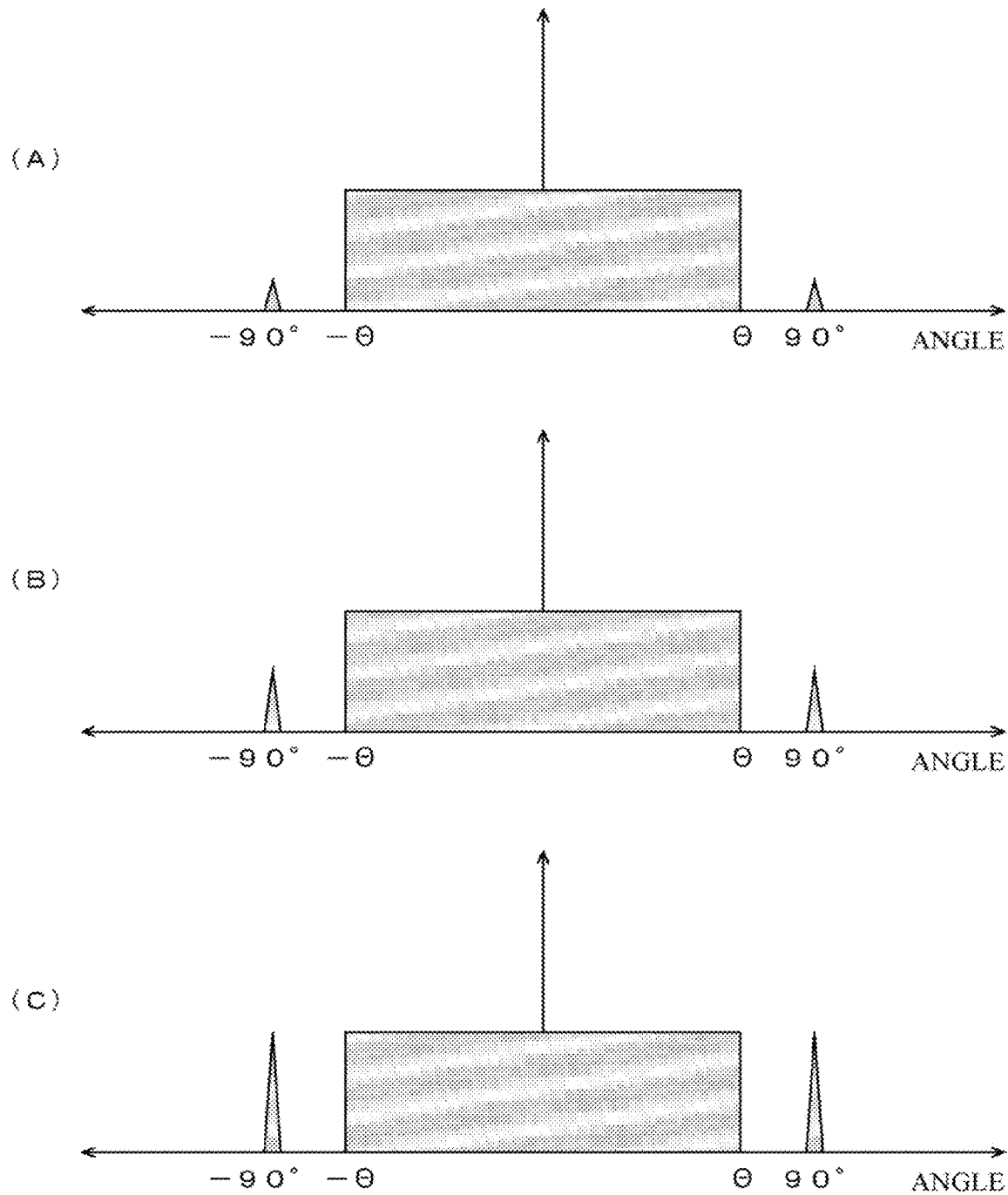
FIG. 15 are views each illustrating a relation between an incident angle of a radio wave and a received signal in the second embodiment.

Next, operations of the second embodiment of the present invention are explained. FIG. 15 are views to explain the operations of the second embodiment. As illustrated in FIG. 15, in the second embodiment of the present invention, not only a signal due to the dispersion part 31 appears at the position of 90° as same as the first embodiment, but also a signal due to the dispersion part 32 appears at a position of −90°. The signal appeared at the position of −90° is the same as the signal appeared at the position of 90°, and when the target exists at the position indicated by the dotted lines illustrated in FIG. 5, the signal is extremely small as illustrated in FIG. 15(A), and when the target exists at the position indicated by the solid lines illustrated in FIG. 5, the signal increases as illustrated in FIG. 15(B), and when the target exists at the position indicated by the dot and dash lines illustrated in FIG. 5, the signal becomes the maximum as illustrated in FIG. 15(C).

When a position of the target in the X-axis direction is detected, an average value of the signals at the position of 90° and at the position of −90° is found, and the position of the target in the X-axis direction may be detected based on this average value. According to such a method, the position of the target in the X-axis direction can be detected more accurately by using the average value of reflected waves from the two dispersion parts 31, 32.

As described hereinabove, in the second embodiment of the present invention, since the dispersion parts 31, 32 are disposed at both sides of the first receiving antenna 17-1 to the eighth receiving antenna 17-8, signals indicating a position of the target in the longitudinal direction can be generated at angular positions of −90° and 90°. It is thereby possible to improve detection accuracy compared to the case when only one dispersion part 31 is provided by doubling the signals indicating the position in the longitudinal direction.

(E) Explanation of Configuration of Third Embodiment

Figure 16:
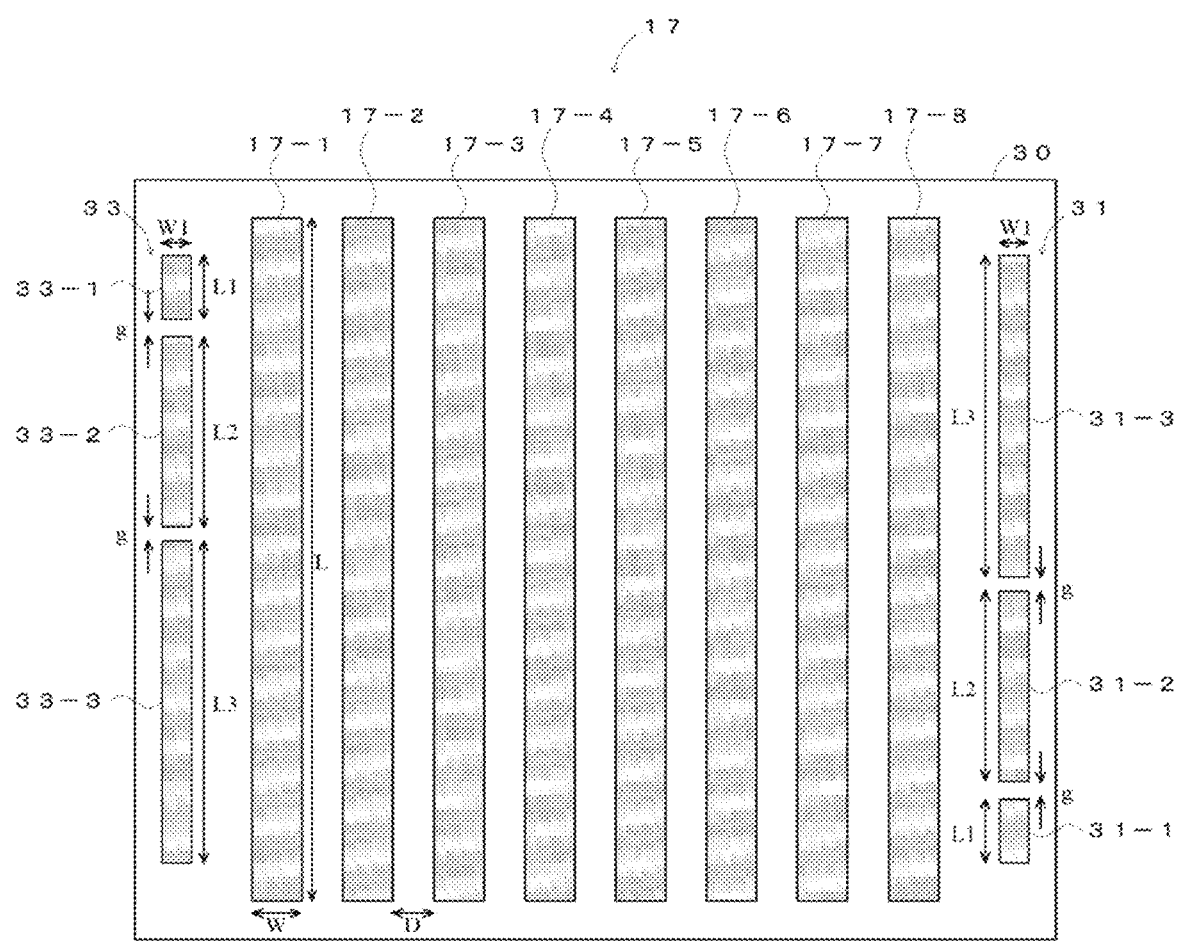
FIG. 16 is a view illustrating a configuration example of a third embodiment.

Next, a third embodiment of the present invention is explained. In the third embodiment, the configurations illustrated in FIG. 1 and FIG. 2 are the same as the first embodiment, but a configuration of a dispersion part illustrated in FIG. 16 is different. In an example in FIG. 16, a dispersion part 33 is added in addition to the dispersion part 31 compared to FIG. 3. Besides, the first receiving antenna 17-1 to the eighth receiving antenna 17-8 are disposed with a distance shorter than 2l2. Other configurations are the same as FIG. 3.

The dispersion part 33 is provided in the vicinity of the first receiving antenna 17-1 and includes resonant elements 33-1 to 33-3. The resonant elements 33-1 to 33-3 have similar configurations as the resonant elements 31-1 to 31-3, but a disposed direction is reversed from the dispersion part 31. That is, the resonant element 33-1 has the rectangular structure with the width W1 and the length L1, the resonant element 33-2 has the rectangular structure with the width W1 and the length L2, and the resonant element 33-3 has the rectangular structure with the width W1 and the length L3. The resonant elements 33-1 to 33-3 are each disposed with the gap g.

(F) Explanation of Operations of Third Embodiment

Figure 17:
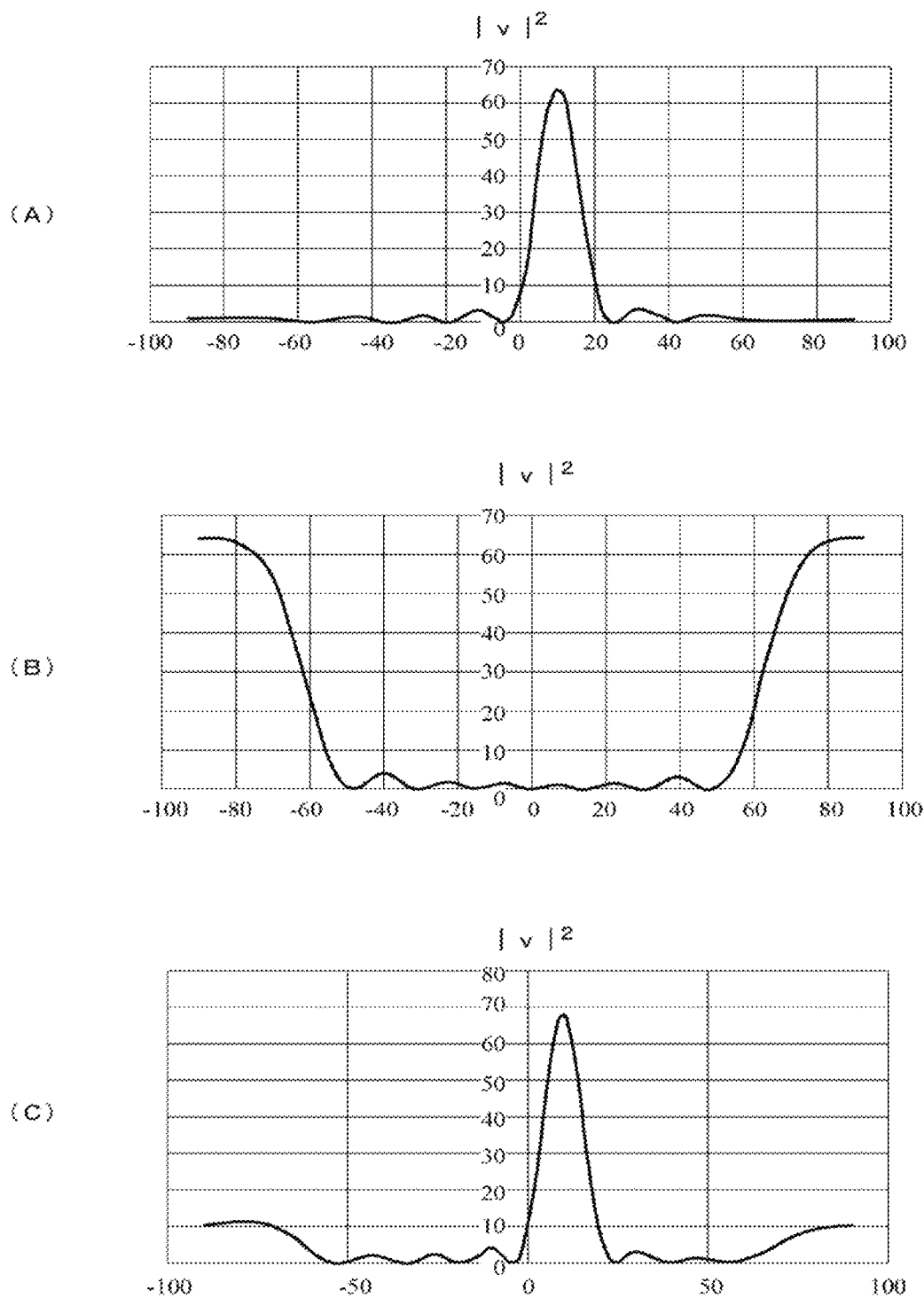
FIG. 17 are views each illustrating a relation between a disposition distance of receiving antennas and a received signal.

Next, operations of the third embodiment of the present invention are explained. In the third embodiment, the first receiving antenna 17-1 to the eighth receiving antenna 17-8 are disposed with the distance shorter than $\lambda/2$ as stated above. That is, in FIG. 16, the distance is set that D<$\lambda/2$. FIG. 17 are views each illustrating a relation between a viewing angle and electric power ($|v|^2$) of a received signal when the distance is set that D<$\lambda/2$. FIG. 17(A) illustrates characteristics of a received signal when a signal at 24 GHz is incident from a direction at a viewing angle of 10°. FIG. 17(B) illustrates characteristics of a received signal by a signal reflected by the dispersion part 31. FIG. 17(C) illustrates an example of a signal which is actually detected when the signal at 24 GHz is incident from the direction at the viewing angle of 10° and a reflected signal from the dispersion part 31 is received while setting a reflection coefficient of the target as 0.3.

Figure 18:
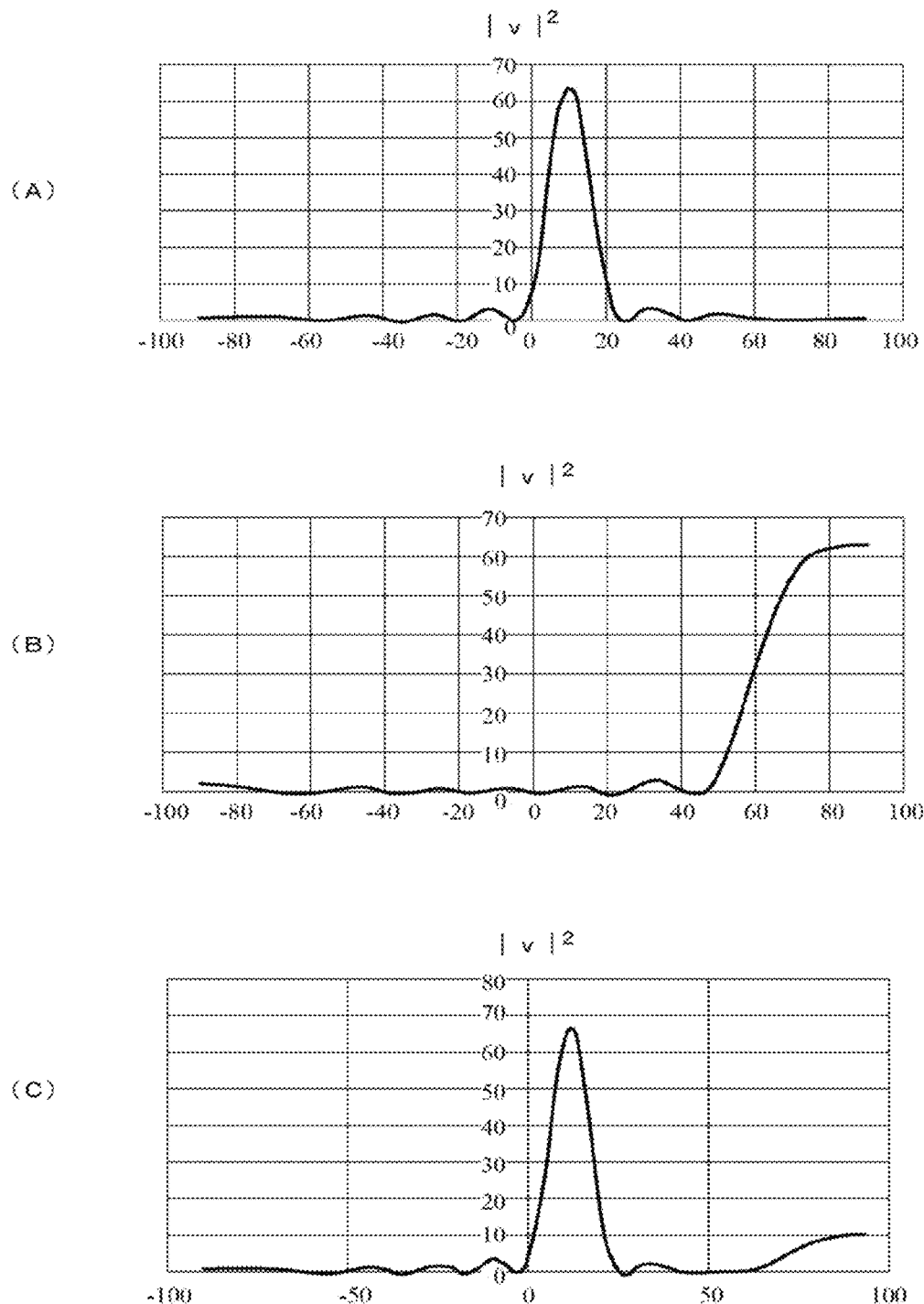
FIG. 18 are views each illustrating a relation between a disposition distance of receiving antennas and a received signal.

Meanwhile, FIG. 18 are views each illustrating a relation between a viewing angle and electric power ($|v|^2$) of a received signal when the distance is set that D=$\lambda/2.5$. FIG. 18(A) illustrates characteristics of a received signal when the signal at 24 GHz is incident from the direction at the viewing angle of 10°. FIG. 18(B) illustrates characteristics of a received signal by a signal reflected by the dispersion part 31. FIG. 18(C) illustrates an example of a signal which is actually detected when the signal at 24 GHz is incident from the direction at the viewing angle of 10° and a reflected signal from the dispersion part 31 is received while setting the reflection coefficient of the target as 0.3. From the comparison between FIG. 17(B) and FIG. 18(B), a direction from which the signal is incident cannot be seen because the reflected signals due to the dispersion part 31 appear at both −90° and +90° when D=λ/2 (in the case of FIG. 17). However, a direction from which the signal is incident can be identified when D=λ/2.5 (in the case of FIG. 18) because the reflected signal due to the dispersion part 31 appears only at +90°. In the first and second embodiments, the distance is set that D≤λ/2 because there is no problem if the direction from which the signal is incident cannot be seen.

Figure 19:
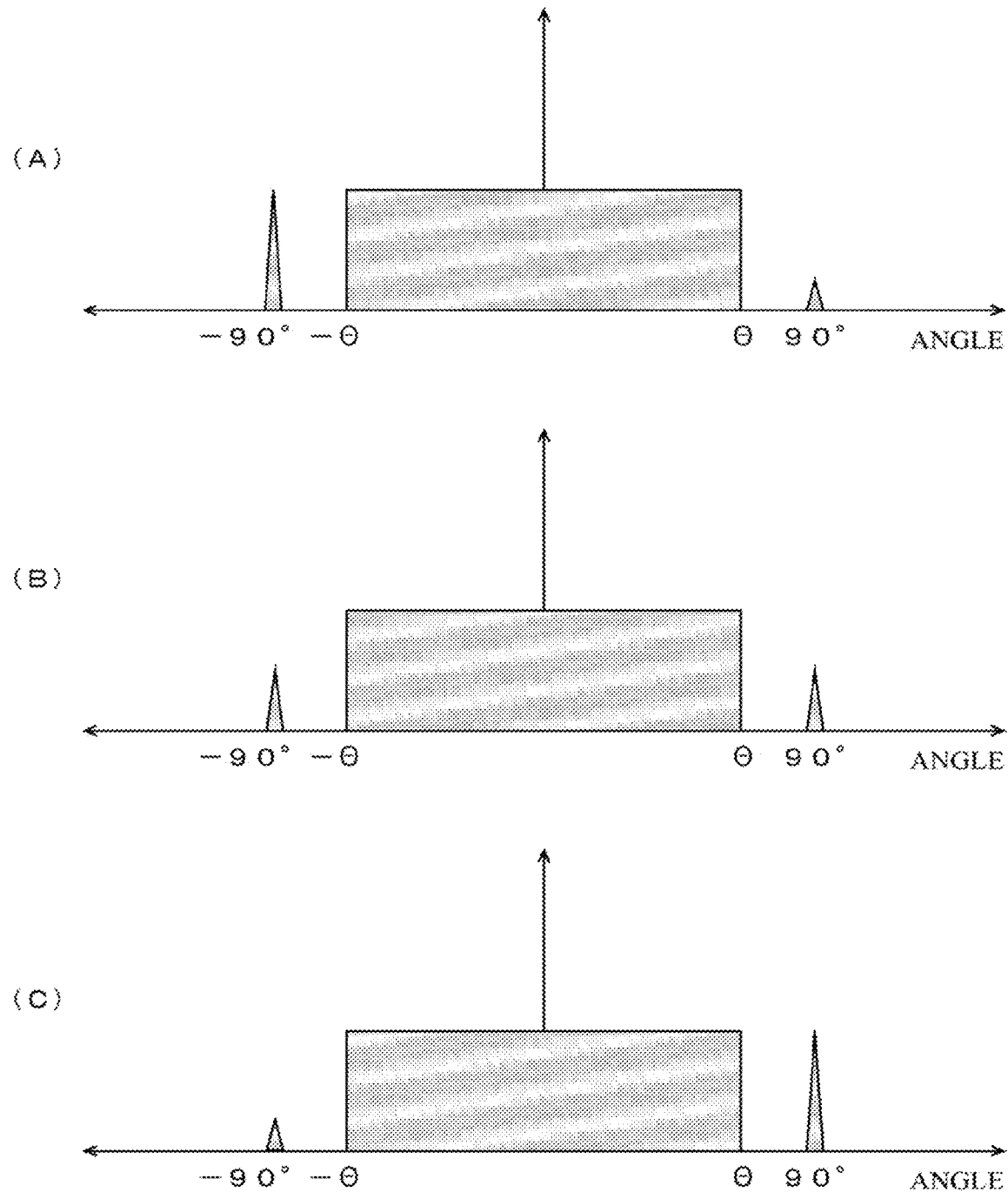
FIG. 19 are views each illustrating a relation between an incident angle of a radio wave and a received signal in the third embodiment.

As illustrated in FIG. 19, in the third embodiment of the present invention, not only the signal due to the dispersion part 31 appears at the position of 90° similar to the first embodiment, but also a signal due to the dispersion part 33 appears at the position of −90°. Note that the signals appearing at the position of −90° are in reverse to the signals appearing at the position of 90°, and when the target exists at the position indicated by the dot and dash lines illustrated in FIG. 5, the signal is extremely small as illustrated in FIG. 19(C), when the target exists at the position indicated by the solid lines illustrated in FIG. 5, the signal increases as illustrated in FIG. 19(B), and when the target exists at the position indicated by the dotted lines illustrated in FIG. 5, the signal becomes the maximum as illustrated in FIG. 19(A).

It may be determined such that a difference value between the signal at 90° and the signal at −90° (the signal at 90°−(the signal at −90°)) is calculated, and when the difference value is plus, the target exists in the plus direction of the X-axis, when the difference value is minus, the target exists in the minus direction of the X-axis, and when the difference value is a value close to "0" (zero), the target exists in the X-axis direction.

As it is explained hereinabove, in the third embodiment of the present invention, the dispersion parts 31, 33 are disposed on both sides of the first receiving antenna 17-1 to the eighth receiving antenna 17-8, and the resonant elements 33-1 to 33-3 forming the dispersion part 33 are arranged in the reverse direction to the dispersion part 31. In addition, the first receiving antenna 17-1 to the eighth receiving antenna 17-8 are disposed with the distance shorter than 2l2. It is therefore possible to generate signals indicating a position of the target in the longitudinal direction at angular positions of −90° and 90°, and to inverse the signals in accordance with the position of the target in the longitudinal direction. It is thereby possible to improve detection accuracy by doubling the signals indicating the position in the longitudinal direction compared to the case when only one dispersion part 31 is provided. In addition, it is possible to reduce occurrence of error detection because when one signal is small, the other signal becomes large.

(G) Explanation of Configuration of Fourth Embodiment

Figure 20:
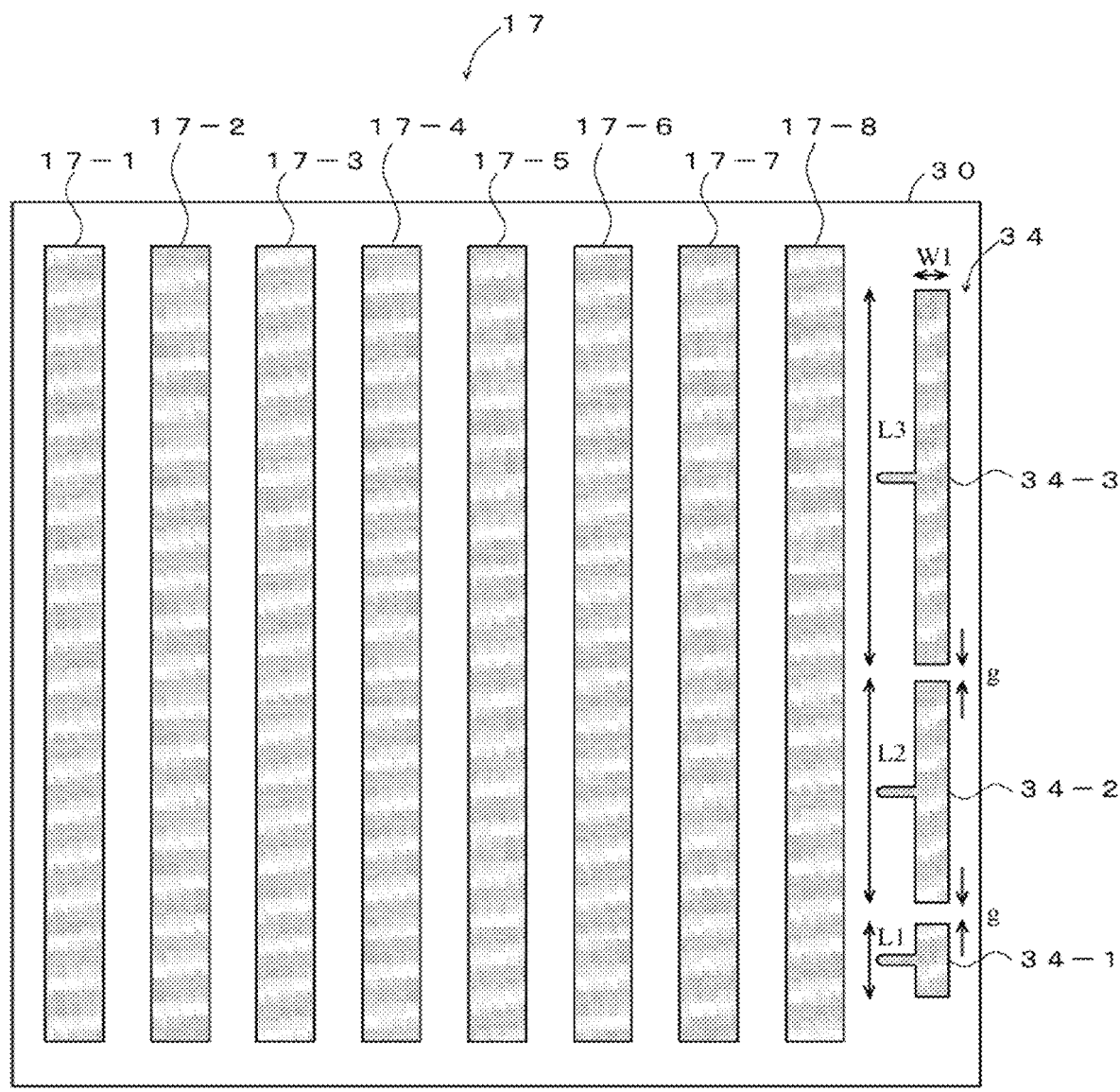
FIG. 20 is a view to explain a configuration example of a fourth embodiment.

Next, a fourth embodiment of the present invention is explained. In the fourth embodiment, the configurations illustrated in FIG. 1 and FIG. 2 are the same as the first embodiment, but a configuration of a dispersion part illustrated in FIG. 20 is different. In an example in FIG. 20, the dispersion part 31 is replaced by a dispersion part 34 compared to FIG. 3. Other configurations are the same as FIG. 3.

The dispersion part 34 is provided in the vicinity of the first receiving antenna 17-1 and includes resonant elements 34-1 to 34-3. The resonant elements 34-1 to 34-3 each have a projecting part at a center part of a rectangular shape, and it is possible to feed power through these projecting parts. The resonant element 34-1 has the rectangular structure with the width W1 and the length L1 having the projecting part at the center part, the resonant element 34-2 has the rectangular structure with the width W1 and the length L2 having the projecting part at the center part, and the resonant element 34-3 has the rectangular structure with the width W1 and the length L3 having the projecting part at the center part. The resonant elements 34-1 to 34-3 are each disposed with the gap g.

(H) Explanation of Operations of Fourth Embodiment

Next, operations of the fourth embodiment of the present invention are explained. In the fourth embodiment, the resonant elements 34-1 to 34-3 are made function as a dispersion part by stopping power feeding to each of the resonant elements 34-1 to 34-3, and the function as the dispersion part can be stopped by feeding power (for example, the resonant elements 34-1 to 34-3 are each set at a ground level). It is thereby possible to make the resonant elements 34-1 to 34-3 function as the dispersion part by stopping the power feeding to each of them only when there is a necessity to detect the position in the longitudinal direction. It is thereby possible to reduce a generation of noises by suppressing reflection from the resonant elements 34-1 to 34-3 by feeding power to the resonant elements 34-1 to 34-3 when the function as the dispersion part is unnecessary.

A difference value of the signals at 90° when the power is fed and not fed is calculated, and the position of the target in the X-axis direction may be detected based on the difference value. According to such a configuration, an effect of noise can be reduced.

(I) Explanation of Modification Example

Figure 21:
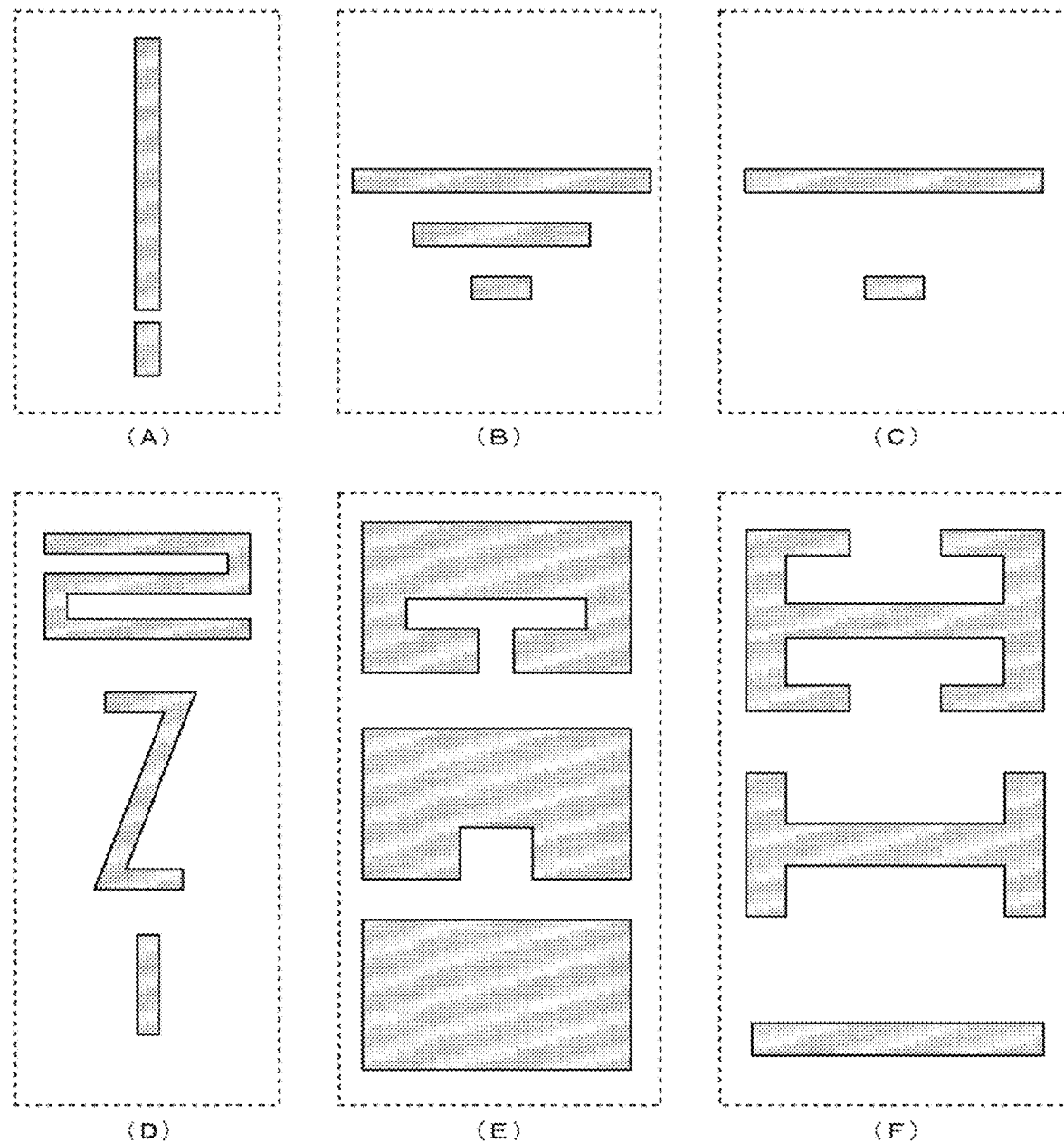
FIG. 21 are views each to explain a configuration example of a modified embodiment of the present invention.

It goes without saying that the embodiments described hereinabove are just examples and the present invention is not limited to the above-stated cases. For example, in the first to fourth embodiments, the resonant elements each having a rectangular shape are used, but shapes of reflection elements are not limited thereto, and for example, the reflection elements having various shapes as illustrated in FIG. 21 can be used. In more detail, it is generally possible to embody the present invention by appropriately designing a dispersion part having a shape which has a length in the X-axis direction and is line-asymmetry with respect to the Y-axis as illustrated in FIG. 8, but for example, in FIG. 21(A), a dispersion part is formed by disposing two resonant elements on a straight line. In FIG. 21(B), a dispersion part is formed by disposing three dispersion elements in parallel. In FIG. 21(C), a dispersion part is formed by disposing two dispersion elements in parallel. In FIG. 21(D), a dispersion part is formed by a resonant element having a shape similar to a numeric character "2", a resonant element having a shape similar to an alphabet "Z", and a resonant element having the rectangular shape. In FIG. 21(E), a dispersion part is formed by a resonant element where a T-shaped cutout is formed at a lower part of a rectangle, a resonant element where a rectangular cutout is formed, and a resonant element without any cutout. In FIG. 21(F), a dispersion part is formed by a resonant element where both ends of a rectangle extending in a left-right direction extend in a longitudinal direction and are bent inside, a resonant element where both ends of a rectangle extending in the left-right direction extend in the longitudinal direction, and a rectangular resonant element just extending in the left-right direction. The effect similar to the above-stated cases can be obtained by using the dispersion parts as illustrated in FIGS. 21 (A) to (F). The resonant elements illustrated in FIGS. 21 (A) to (F) each forming the dispersion part may be set so as to resonate at different frequencies as stated above. That is, the frequency of the resonant element existing at an upper side in the longitudinal direction in each of FIG. 21 is set to be low, and the frequency of the resonant element existing at a lower side is set to be high.

In each of the examples in FIG. 21, the dispersion part is formed by a plurality of members, but for example, the dispersion part may be formed by a single member having a triangular shape as illustrated in FIG. 22(A). The dispersion part illustrated in FIG. 22(A) is just an example, and it may have a shape other than a triangle as long as dispersion properties of a radio wave change. As illustrated in FIG. 22(B), a dispersion part may be formed by obliquely cutting an end part of the circuit board 30. A dispersion part may be formed by not obliquely cutting the end part of the circuit board 30 but by forming a plurality of holes at the end part of the circuit board 30 as illustrated in FIG. 22(C). Since a conductor for grounding is formed over a rear surface of the circuit board 30, it may be made function as a slot antenna by forming the plurality of holes at the conductor as illustrated in FIG. 22(C).

The dispersion element may be formed not by a conductor but by, for example, an absorber or a reflector of a radio wave. A dispersion part may be formed by changing a thickness of a dielectric.

Figure 22:
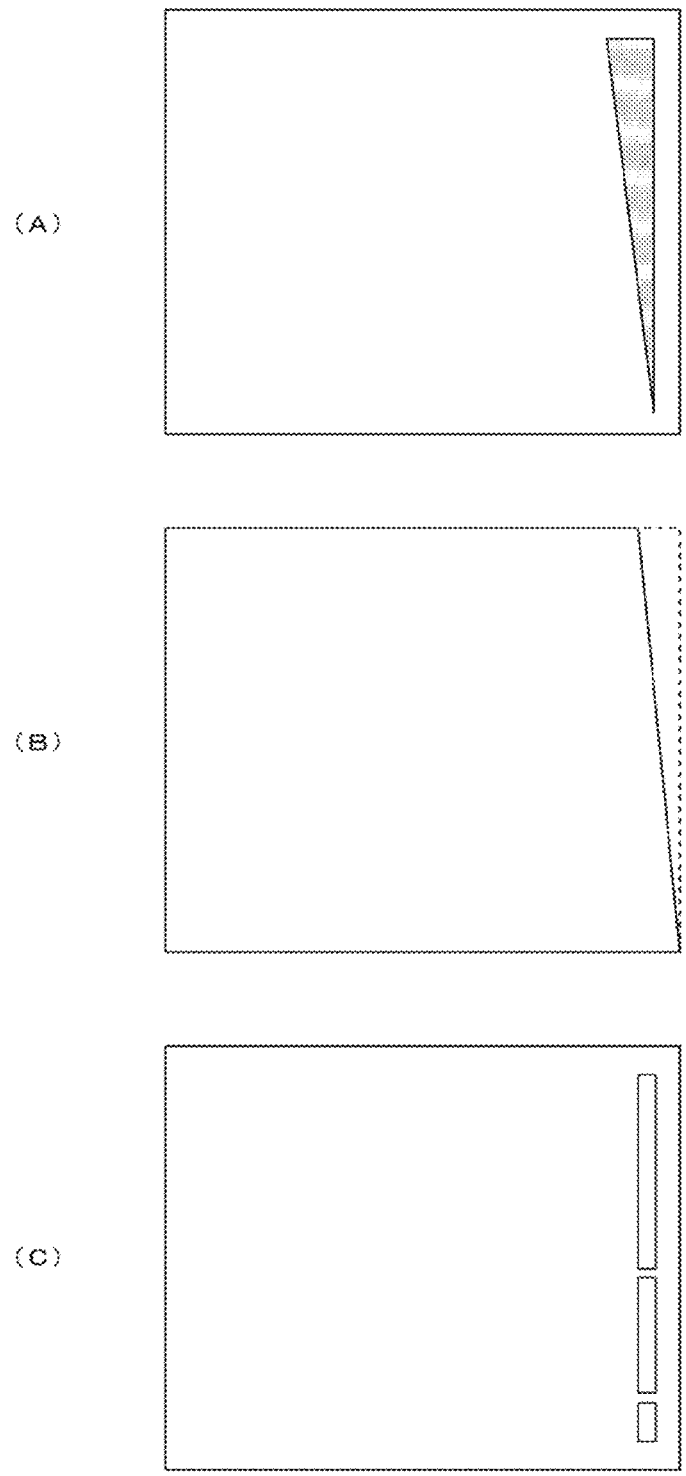
FIG. 22 are views each to explain a configuration example of a modified embodiment of the present invention.

For example, the dispersion parts illustrated in FIGS. 21 (A) to (F) and FIGS. 22 (A) to (C) may be provided on one side of the first receiving antenna 17-1 to the eighth receiving antenna 17-8 as illustrated in the first embodiment, on both sides in the same arrangement as illustrated in the second embodiment, on both sides in a reverse direction arrangement as illustrated in the third embodiment, or the power feeding part may be provided to feed power as illustrated in the fourth embodiment.

In each of the above-stated embodiments, the resonant element disposed at the center part is set to resonate at the same frequency as a radio wave, but may be set to resonate at a frequency different from the radio wave. The resonant frequency may be different from the frequency of the radio wave as long as the dispersion properties change in the length direction of the first receiving antenna 17-1 to the eighth receiving antenna 17-8 when the incident angle changes.

In each of the above-stated embodiments, the dispersion part is provided on the circuit board 30, but for example, the dispersion part may be formed on a radome covering the circuit board 30 where the first receiving antenna 17-1 to the eighth receiving antenna 17-8 are formed. Further, the dispersion part may be provided not at the same layer where the first receiving antenna 17-1 to the eighth receiving antenna 17-8 are formed but at a different layer of the circuit board 30 (for example, an intermediate layer or a rear side surface). Regarding the radome, the dispersion part may be provided not on the surface of the radome but may be disposed at an inside of a resin forming the radome.

In the configuration illustrated in FIG. 3, the transmitting antenna 13 transmits the pulse signal, but an FMCW (frequency modulated continuous wave) may be used.

In the embodiment illustrated in FIG. 3, the outputs from the first receiving antenna 17-1 to the N-th receiving antenna 17-N are alternatively selected by the antenna switching part 18, but the gain variable amplifying part 19, the demodulation part 20, and the A/D conversion part 21 may be provided for each of the first receiving antenna 17-1 to the N-th receiving antenna 17-N, and outputs of the A/D conversion parts 21 may be selected by a selection part to be supplied to the control and process part 15. It goes without saying that a selection part may be provided at a subsequent stage of the gain variable amplifying part 19 or the demodulation part 20, and an output of the gain variable amplifying part 19 or the demodulation part 20 may be selected by the selection part.

In each of the above-stated embodiments, the case when the first receiving antenna 17-1 to the eighth receiving antenna 17-8 (that is, N=8) are used is exemplified to be explained, but the number of receiving antennas may be other than the above. It is desirable to use the number of receiving antennas of exponentiation of two because an FFT (fast fourier transform) process is performed.

The shape of the first receiving antenna 17-1 to the eighth receiving antenna 17-8 illustrated in FIG. 3 or the like is just an example, and it goes without saying that the present invention is not limited to the shape illustrated in FIG. 3.

In each of the above-stated embodiments, a four-wheeled automobile is exemplified as a vehicle to be explained, but a two-wheeled automobile, a bicycle, and the like may be detected other than the above. That is, the vehicle is not limited to the four-wheeled automobile in the specification.

The processes of the flowchart illustrated in FIG. 13 are just examples, and it goes without saying that the present invention is not limited to the processes in the flowchart.

In each of the above-stated embodiments, the case when the radar device is attached to a moving body such as a vehicle is exemplified to be explained, but the invention of the present application may be applied to a radar device fixedly disposed.

As a material of the resonant elements 31-1 to 31-3, 32-1 to 32-3, 33-1 to 33-3, and 34-1 to 34-3 forming the dispersion parts 31, 32, 33, and 34, any material can be used as long as properties dispersing a radio wave are held. For example, a conductor such as copper, aluminum and gold, and a conductor such as a conductive resin can be used. A dielectric having dispersion properties can also be used without being limited to the conductors.

EXPLANATION OF REFERENCE SIGNS 1 radar system
10 local oscillation part
11 transmitting part
12 modulation part
13 transmitting antenna
15 control and process part
15a control part
15b process part
15c detection part
15d communication part
16 receiving part
17 receiving array antenna
17-1 to 17-8 first receiving antenna to eighth receiving antenna
18 antenna switching part
19 gain variable amplifying part
20 demodulation part
21 A/D conversion part
30 circuit board
31, 32, 33, 34 dispersion part
31-1 to 31-3, 32-1 to 32-3, 33-1 to 33-3, 34-1 to 34-3 resonant element

The invention claimed is:
1. A radar device which detects a target by using a radio wave, comprising:

a receiving array antenna where a plurality of receiving antenna elements each having a predetermined length in a first direction are arranged to be disposed in a second direction almost orthogonal to the first direction;

two dispersion parts which are disposed so as to sandwich the receiving array antenna in a vicinity of the receiving array antenna, dispersion properties of the radio wave changing with respect to the first direction, the two dispersion parts having same dispersion properties and disposed in reversed directions; and a detection part which detects a position of the target in the first direction based on the radio wave reflected by the two dispersion parts, wherein the receiving array antenna and the two dispersion parts are disposed on a circuit board with a conductor for grounding formed over a rear surface thereof, and each of the two dispersion parts is formed by forming a plurality of holes at an end part of the conductor of the circuit board.

2. A radar device which detects a target by using a radio wave, comprising:

a receiving array antenna where a plurality of receiving antenna elements each having a predetermined length in a first direction are arranged to be disposed in a second direction almost orthogonal to the first direction;

two dispersion parts which are disposed so as to sandwich the receiving array antenna in a vicinity of the receiving array antenna, dispersion properties of the radio wave changing with respect to the first direction, the two dispersion parts having same dispersion properties and disposed in reversed directions; and a detection part which detects a position of the target in the first direction based on the radio wave reflected by the two dispersion parts, wherein each of the two dispersion parts is formed by three resonance elements that are disposed in the second direction sequentially and are in shapes of "2", "Z", and "1", respectively.

3. A radar device which detects a target by using a radio wave, comprising:

a receiving array antenna where a plurality of receiving antenna elements each having a predetermined length in a first direction are arranged to be disposed in a second direction almost orthogonal to the first direction;

two dispersion parts which are disposed so as to sandwich the receiving array antenna in a vicinity of the receiving array antenna, dispersion properties of the radio wave changing with respect to the first direction, the two dispersion parts having same dispersion properties and disposed in reversed directions; and a detection part which detects a position of the target in the first direction based on the radio wave reflected by the two dispersion parts, wherein the receiving array antenna and the two dispersion parts are disposed on a circuit board that includes a plurality of layers, and each of the two dispersion parts is formed by two or more resonance elements, at least two of which are formed at different layer of the circuit board.

* * * * *